(12) United States Patent
Kalari et al.

(10) Patent No.: US 12,026,510 B1
(45) Date of Patent: Jul. 2, 2024

(54) USING CYCLE COUNTS TO SERVE COMPUTE ELEMENTS EXECUTING STATICALLY SCHEDULED INSTRUCTIONS FOR A MACHINE LEARNING ACCELERATOR

(71) Applicant: SiMa Technologies, Inc., San Jose, CA (US)

(72) Inventors: Subba Rao Venkata Kalari, San Jose, CA (US); Saurabh Jain, Cupertino, CA (US)

(73) Assignee: SIMA TECHNOLOGIES, INC., San Jose, CA (US)

(*) Notice: Subject to any disclaimer, the term of this patent is extended or adjusted under 35 U.S.C. 154(b) by 29 days.

(21) Appl. No.: 18/095,447

(22) Filed: Jan. 10, 2023

(51) Int. Cl.
  *G06F 9/30* (2018.01)
  *G06F 9/38* (2018.01)

(52) U.S. Cl.
  CPC ...... *G06F 9/30032* (2013.01); *G06F 9/30043* (2013.01); *G06F 9/3867* (2013.01)

(58) Field of Classification Search
  None
  See application file for complete search history.

(56) References Cited

U.S. PATENT DOCUMENTS

| | | | | |
|---|---|---|---|---|
| 6,032,261 A | * | 2/2000 | Hulyalkar | H04J 3/0652 713/400 |
| 2004/0223516 A1 | * | 11/2004 | Adkisson | H04L 7/005 375/364 |
| 2004/0225909 A1 | * | 11/2004 | Adkisson | G06F 1/12 713/400 |
| 2005/0063419 A1 | * | 3/2005 | Schrader | H04W 40/248 370/466 |
| 2013/0247010 A1 | * | 9/2013 | Bradbury | G06F 11/3466 717/130 |

\* cited by examiner

*Primary Examiner* — Michael Sun
(74) *Attorney, Agent, or Firm* — Fenwick & West LLP

(57) ABSTRACT

A machine learning accelerator (MLA) implemented on a semiconductor die includes a computing mesh of interconnected compute elements that includes storage elements (SEs) and processing elements (PEs). The compute elements execute a program of instructions to implement a machine learning network according to a static schedule for execution of the instructions. A compiler determines allowable time windows for the transfer of instructions and/or data from off-chip memory to the compute elements in order to fulfill the static schedule. If instructions/data are available before the time window opens, they are held until the window opens. If the window is about to close and the transfer of instructions/data is not yet complete, the execution of statically scheduled instructions is suspended to allow the transfer to complete within the window.

20 Claims, 19 Drawing Sheets

US 12,026,510 B1

USING CYCLE COUNTS TO SERVE COMPUTE ELEMENTS EXECUTING STATICALLY SCHEDULED INSTRUCTIONS FOR A MACHINE LEARNING ACCELERATOR

BACKGROUND

1. Technical Field

This disclosure relates generally to the implementation of machine learning networks on hardware and more particularly to providing instructions and/or data to synchronized compute elements that execute statically scheduled instructions.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether or to what confidence level objects are present within the images.

Machine learning networks typically require the handling of a large volume of data and the execution of a large number of computations. As a result, they are commonly implemented in compute facilities with access to significant resources, such as in the cloud or on server clusters. There can be many advantages if the machine learning network was instead embedded on edge devices, such as combined in a camera system. However, many types of edge devices, such as cameras, have resource limitations. They may be limited in memory, processing capability, power consumption, etc. As a result, on-chip compute elements may be simplified to conserve resources, but this may give rise to a need to synchronize the operation of these elements.

BRIEF DESCRIPTION OF THE DRAWINGS

Embodiments of the disclosure have other advantages and features which will be more readily apparent from the following detailed description and the appended claims, when taken in conjunction with the example embodiments in the accompanying drawings, in which:

DETAILED DESCRIPTION OF THE PREFERRED EMBODIMENTS

Figure 1:
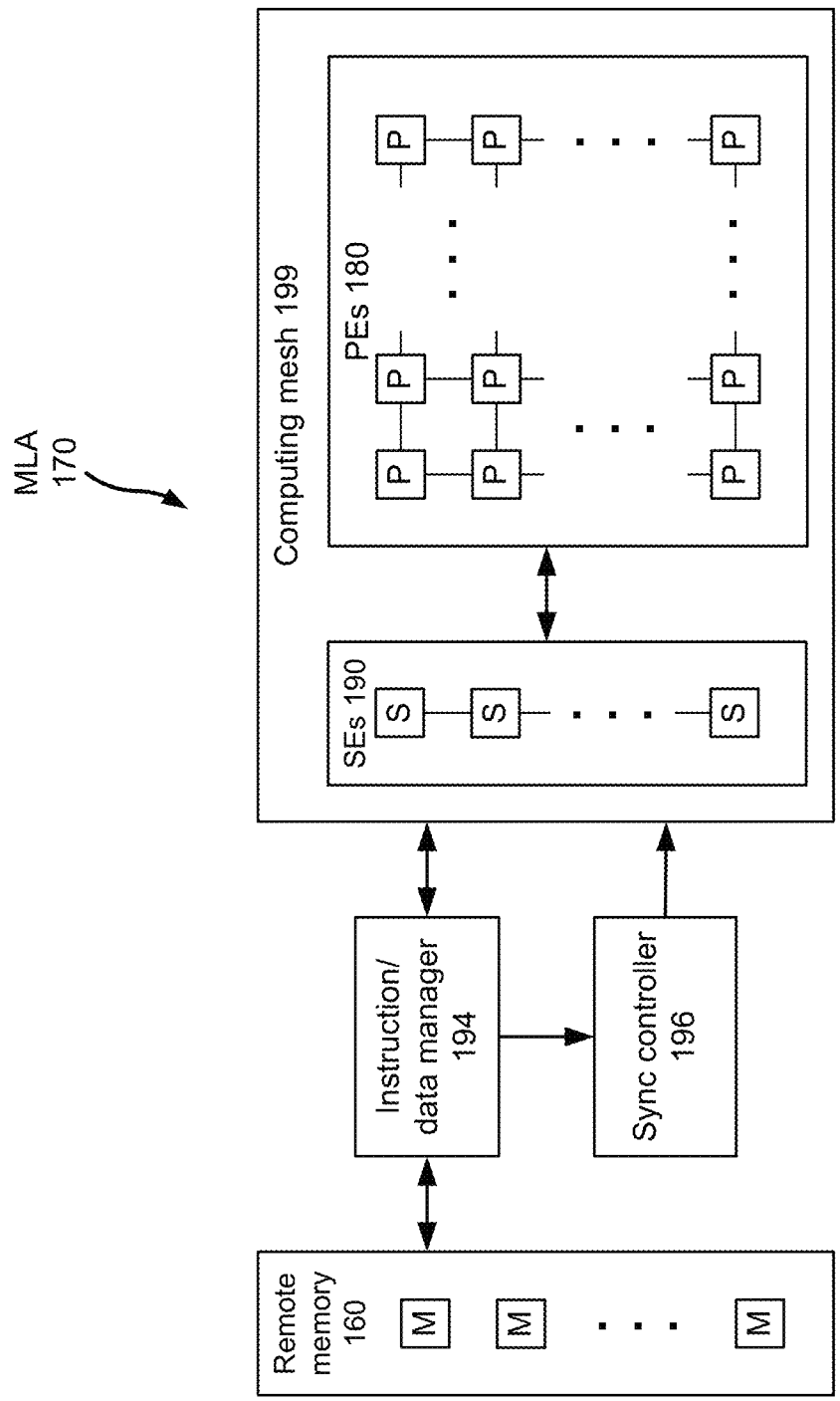
FIG. 1 is a block diagram of a system providing instructions and/or data to synchronized compute elements in a machine learning accelerator (MLA).

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MLNs) are commonly implemented in compute facilities with access to significant resources, such as in the cloud or on server clusters. However, the sources of input to machine learning networks may be located remotely from these large compute facilities. For example, cameras and other types of sensors may be edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras including both still image and video cameras, microphones, temperature sensors, pressure sensors and other types of sensors. The sensors may capture samples that are used as inputs to a computing pipeline within the edge device. Thus, it would be beneficial if MLNs could be implemented in edge devices.

A machine learning accelerator (MLA) is described herein that may be built into an edge device. The MLA executes a machine learning network. As will be described in more detail below, one method of optimizing execution of an MLN is to use a compiler that, prior to run-time, generates a computer program with statically scheduled instructions for executing the MLN. For example, the compiler may determine which instructions are executed by which compute elements in the MLA at what time. Static scheduling enables the compute elements in the MLA to execute the instructions with no run-time conditions, branching or dependencies. This may result in lower power consumption, simpler MLA design, and lower cost.

However, because on-chip memory is limited, the statically scheduled instructions and corresponding data may be stored in off-chip memory and then transferred to on-chip storage elements for consumption by the on-chip processing elements. On-chip memory such as SRAM has a known access time, so data transfers from/to SRAM storage elements to/from processing elements may be statically scheduled. However, SRAM typically has limited space.

Off-chip memory such as DRAM has much more space available, but it has variable access time, so the compiler may not be able to predict when the instructions or corresponding data fetched from the off-chip memory will be ready for execution and cannot statically schedule data and instruction transfers from DRAM. This issue may be compounded if instructions are to be executed by multiple compute elements according to a common static schedule because the compiler assumes that the compute elements are synchronized in their operation. It may be problematic if one compute element starts execution of its statically scheduled instructions later than another compute element, just because its instructions or data arrived later.

In one approach, the compiler determines allowable time windows for the transfer of instructions and/or data from off-chip memory to the compute elements in order to fulfill the static schedule. If instructions/data are available before the time window opens, they are held until the window opens. If the window is about to close and the transfer of instructions/data is not yet complete, the execution of statically scheduled instructions is suspended to allow the transfer to complete within the window.

FIG. 1 is a high level diagram of such a system. The system includes a machine learning accelerator 170. The MLA 170 includes a mesh 199 of compute elements, which in this example includes interconnected storage elements (SEs) 190 and processing elements (PEs) 180. Within the computing mesh 199, data can be transferred between the SEs 190 and/or PEs 180 according to statically scheduled data transfer instructions. The PEs 180 perform computations according to statically scheduled compute instructions. These data transfer and compute operations within the mesh 199 are deterministic, meaning that the compiler may determine at compile time how many cycles are required to execute each instruction. As a result, these instructions may be statically scheduled by the compiler. They are then executed by the compute elements 180, 190 within mesh 199 according to the static schedule, according to a cycle count produced by a clock or counter. This cycle count is referred to as the execution cycle count, to avoid confusion with other cycle counts introduced below.

The system in FIG. 1 also includes an off-chip memory 160. The MLA 170 fetches instructions and data from the off-chip memory 160 for the computing mesh 199. The MLA 170 also transfers data from the computing mesh 199 to the off-chip memory 160. The MLA 170 may do this through a dedicated memory interface, such as a direct memory access (DMA) interface. The time required for these transfers is not predictable enough to be statically scheduled. As a result, it is possible that the compute elements 180, 190 may reach a point in the static schedule where the required instructions or data for some compute element has not yet been transferred from the off-chip memory. If that compute element waits while the other compute elements continue execution, then the elements 180, 190 in computing mesh 199 will no longer be synchronized and the static schedule will be violated.

To avoid this, in FIG. 1, the MLA 170 also includes an instruction/data manager 194 and a sync controller 196. The manager 194 manages the transfer of instructions and/or data between the remote memory 160 and the compute elements 180, 190. In FIG. 1, the manager 194 is shown as a box separate from the computing mesh 199. However, it may be implemented in a distributed fashion as part of each compute element 180, 190. It may also be implemented as separate elements, for example an instruction manager for the transfer of instructions and a separate data manager for the transfer of data.

Using instructions as an example, the instruction manager 194 receives instructions from the off-chip memory 160 and transfers blocks of instructions to the computing mesh 199 for execution. The instruction manager 194 has access to the execution cycle count used to clock the instruction execution by the computing mesh 199. The instruction manager 194 also knows the time window during which each instruction block may be transferred to the computing mesh 199 without disturbing the statically scheduled execution of instructions by the computing mesh. If the instruction transfer cannot complete within the allowed time window, the instruction manager 194 may generate a request, which for convenience will be referred to as the sync request. The instruction manager 194 sends the sync request to the sync controller 196, which suspends operation of the computing mesh 199 in order to allow the transfer to take place within the allowed time window. In one approach, the sync controller 196 suspends operation by temporarily stopping the execution cycle count.

In one approach, the time window for an instruction block is defined by a send-after cycle count and a send-before cycle count for that block. Roughly speaking, the time window opens as defined by the send-after cycle count (instructions transfer after the send-after cycle count) and closes as defined by the send-before cycle count (instruction transfer completes before the send-before cycle count). The instruction manager 194 ensures that the instruction block is transferred to the computing mesh 199 in accordance with the send-after cycle count and the send-before cycle count. That is, the instruction manager 194 ensures that the instruction block is transferred within the allowed time window.

To be more precise, the send-after cycle count defines an execution cycle count for a particular action relating to the timing of the beginning of the instruction transfer, and the instruction manager 194 ensures that the particular action occurs in accordance with the send-after cycle count because the instruction manager controls the transfer of instructions. Similarly, the send-before cycle count defines an execution cycle count for a specific action relating to the timing of the completion of the instruction transfer, and the instruction manager 194 ensures that the specific action occurs in accordance with the send-before cycle count by stalling the execution cycle count if the specific action has not yet occurred by the send-before cycle count.

Figure 2A:
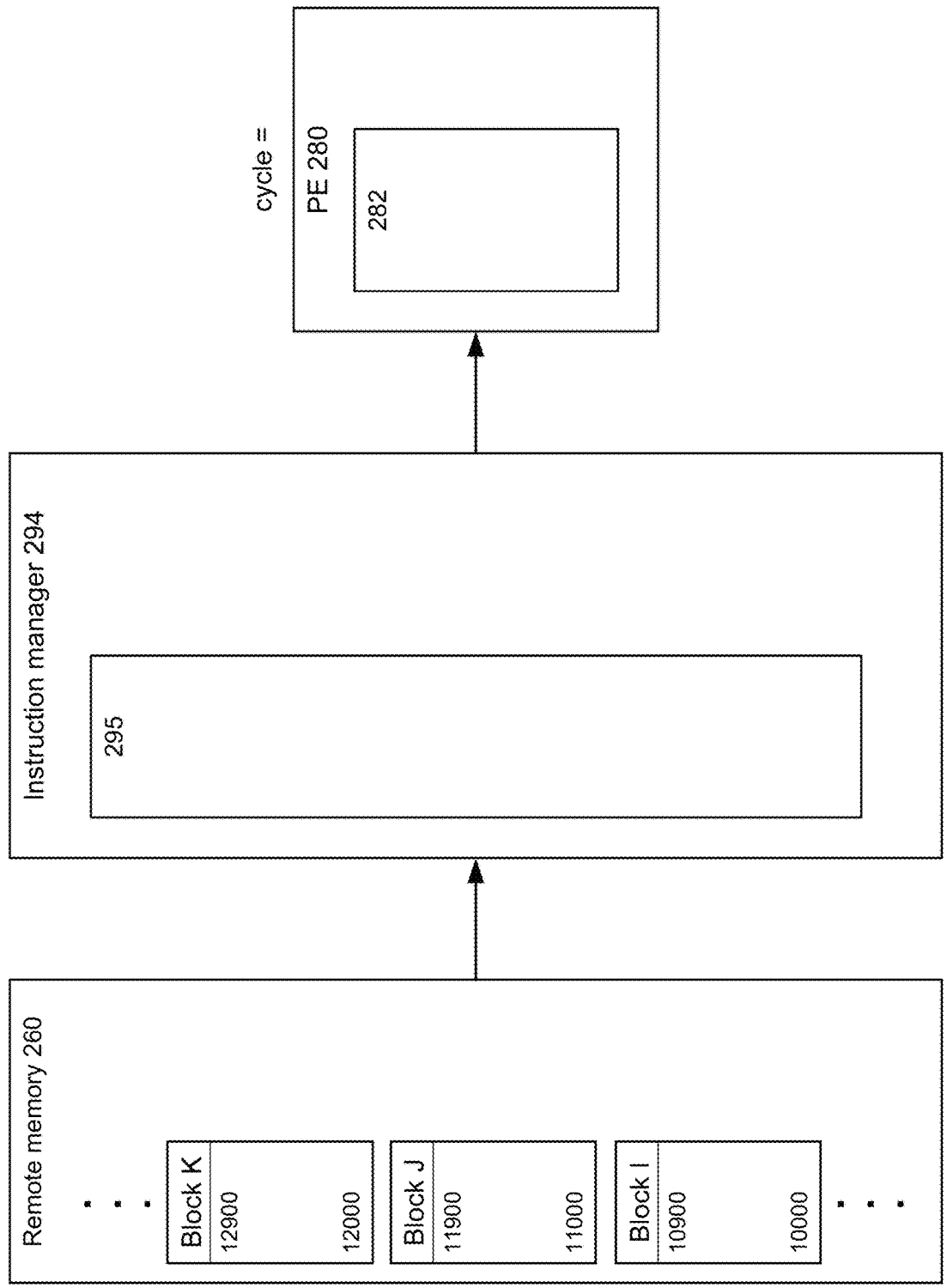
FIGS. 2A-2E are diagrams illustrating instruction transfer to synchronized compute elements using send-after and send-before cycle counts.

FIGS. 2A-2E show an example. These figures show the remote memory 260, instruction manager 294 and a single processing element (PE) 280. The PE 280 has an instruction queue 282. The instruction manager 294 also has a queue 295. The instruction manager 294 receives instructions from the remote memory 260 and buffers them in its queue 295. It then transfers the instructions to the instruction queue 282 of the relevant PE 280, which executes the instructions according to the static schedule. This example considers the transfer of instructions to a single PE 280. As shown in FIG. 2A, the instructions are originally stored in the remote memory 260. The instructions are divided into blocks, which are to be executed sequentially according to a static schedule.

FIG. 2A shows blocks I, J, K, where block I is executed before block J, which is executed before block K. The example in FIGS. 2A-2E illustrates the transfer of block J to the PE 280. The instructions are statically scheduled, so the compiler knows when each instruction will execute. This is also shown in FIG. 2A. The instructions in block I begin execution on cycle count 10000 and complete execution on cycle count 10900. The instructions in block J begin on cycle count 11000 and complete on cycle count 11900. The instructions in block K begin on cycle count 12000 and complete on cycle count 12900.

The example in FIGS. 2A-2E makes the following simplifying assumptions for purposes of illustration. These conditions are not required for actual devices. First, there is a gap between the last cycle of one block and the beginning cycle of the next block. For example, block I ends on cycle 10900, but block J does not begin until cycle 11000. This is not required and the blocks may be directly adjacent in execution, with one block beginning immediately after the previous block ends. Another simplifying assumption is that the instruction transfer from manager 294 to PE 280 is instantaneous. Actual instruction transfers may require a finite number of execution cycles and this latency may be accounted for by adjusting the send-before and send-after cycle counts accordingly. Similarly, suspending operation of the computing mesh is also assumed to be instantaneous. The latency between the instruction manager 294 generating a sync request and the actual suspension of instruction execution is assumed to be zero. Non-zero latencies may be accounted for by adjusting the send-before and send-after cycle counts accordingly. As a final simplifying assumption, the instruction queue 282 is assumed to have capacity for only one block at a time. Block I must be fully executed before block J can be loaded into the instruction queue. These assumptions simplify the example in FIGS. 2A-2E, allowing various principles to be more clearly explained. After this initial explanation, variations that relax these assumptions are discussed.

Figure 2B:
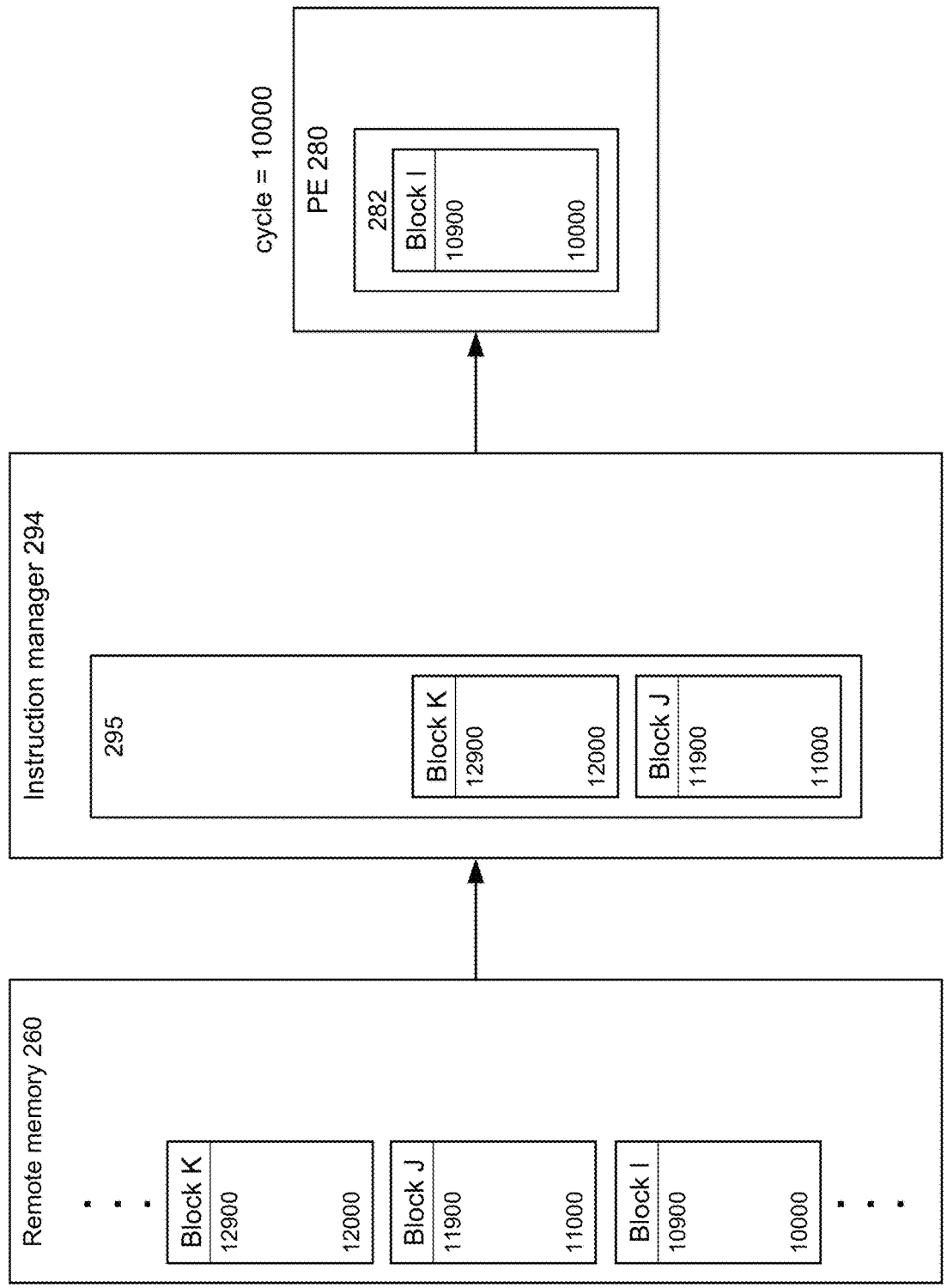

FIG. 2B shows the system during execution of the instructions. The execution cycle count=10000. Block I has been transferred to the instruction queue 282 and is just starting to execute. Blocks J and K have been transferred from the remote memory 260 to the instruction manager queue 295 and are awaiting transfer to the PE 280. Block J cannot yet be transferred to the instruction queue 282, because the queue is currently occupied by block I.

Figure 2C:
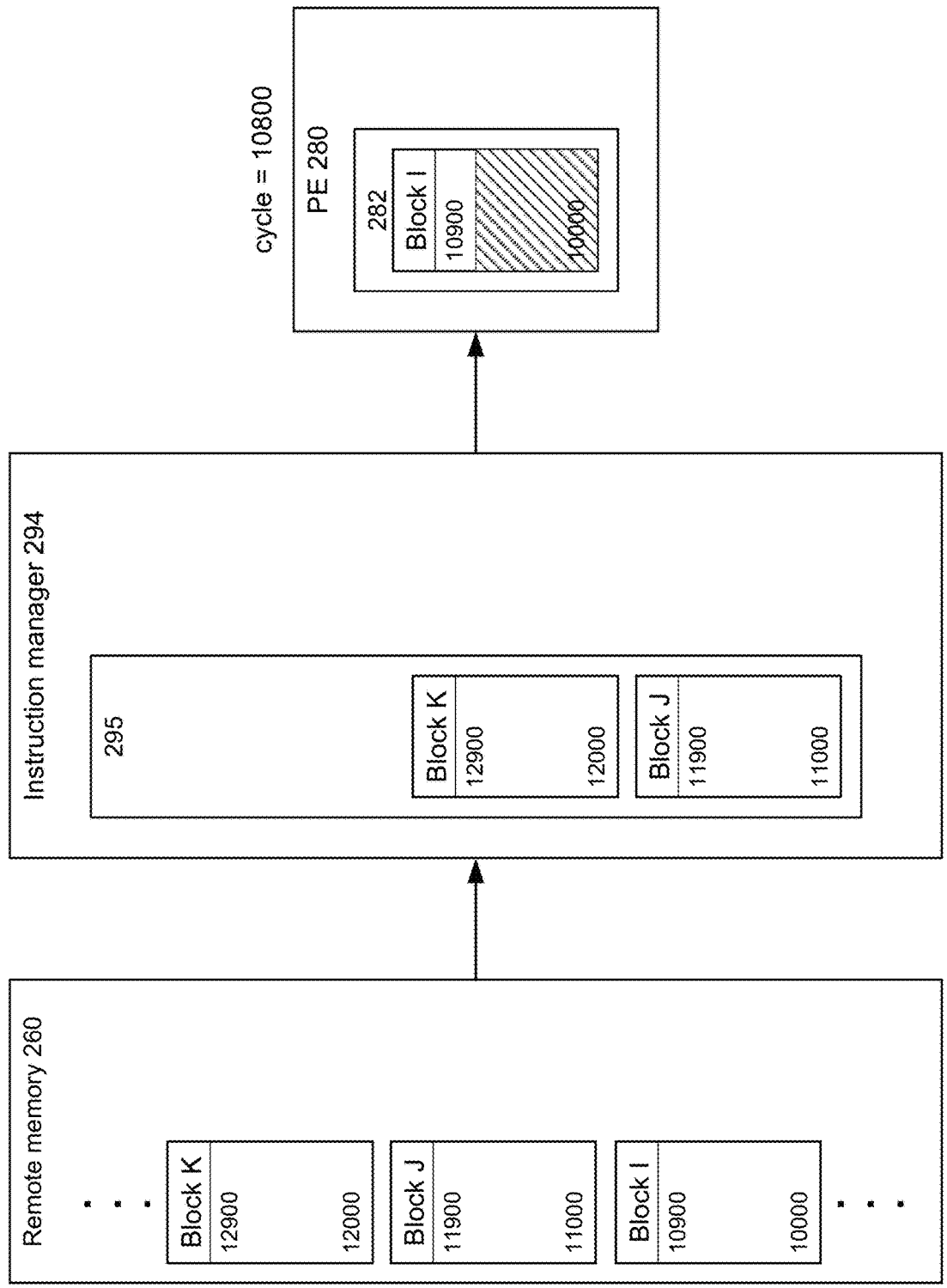

FIG. 2C shows the situation late in the execution of block I. The execution cycle count=10800. Most of block I has executed, as denoted by the cross-hatching. However, the simplifying assumptions for this example are that all of block I must execute before the instruction queue 282 is freed to receive block J, and that the transfer of block J is instantaneous. Therefore, block J still cannot be transferred to the instruction queue at execution cycle count=10800, so the instruction manager 294 continues to hold block J.

Figure 2D:
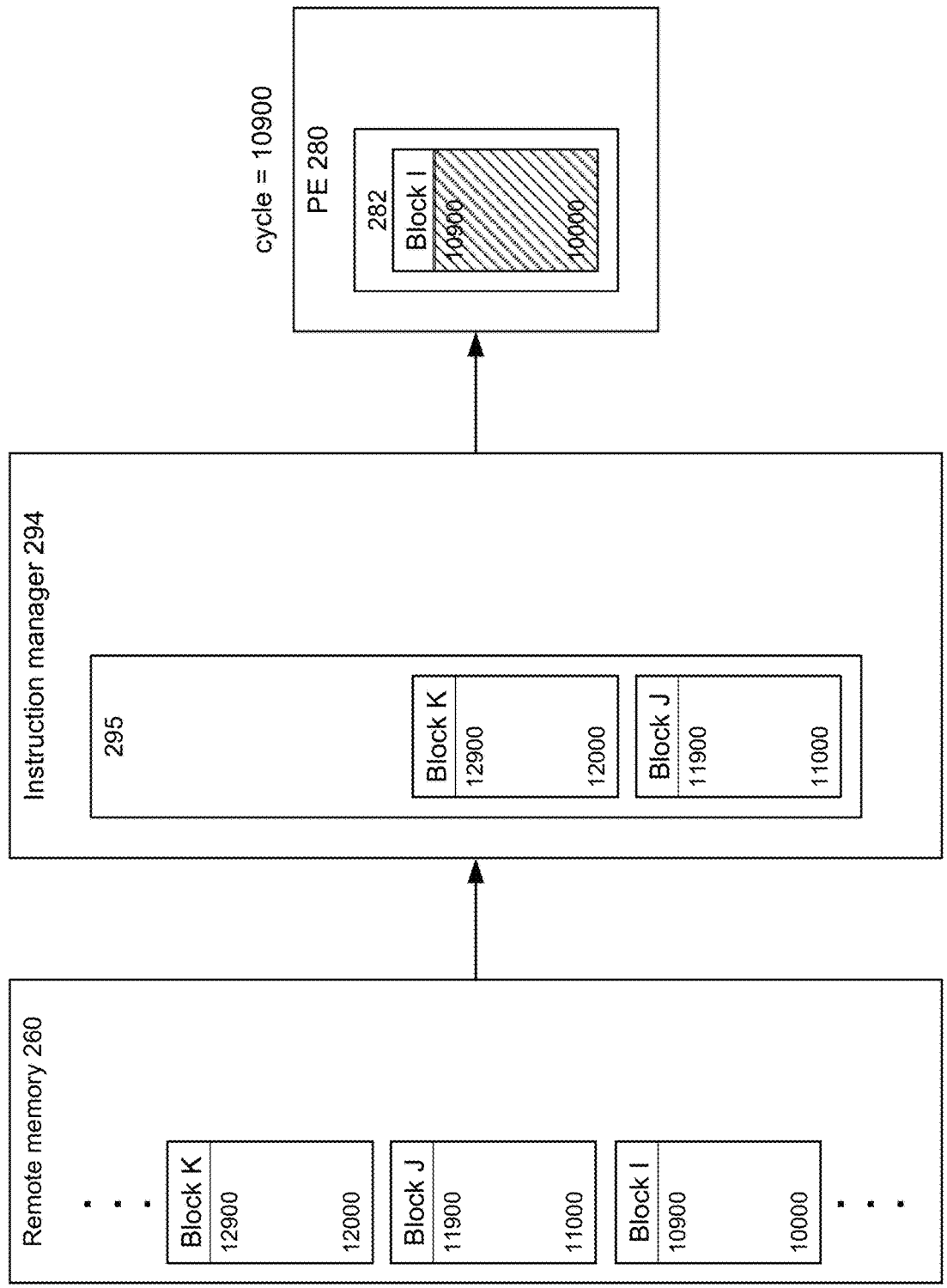

FIG. 2D shows execution cycle count=10900, when block I has finished execution. At this point, block J can be transferred to the instruction queue 282. In this example, the send-after cycle count for block J may be set as 10900, because transferring block J to the PE 280 after execution cycle count=10900 ensures that the instruction queue 282 has sufficient space to receive block J, thus avoiding any conflict with the previous instruction block I. The send-after cycle count does not have to be set at exactly 10900. It could be set later, for example if some buffer cycles are desired. It could also be set earlier, for example if some of the assumptions are relaxed. If it takes 10 cycles for block J to arrive at the PE 280, then the send-after cycle count could be set earlier to take advantage of this latency. The send-after cycle count could also be set earlier (e.g., to 10800 in FIG. 2C), if the block J instructions start to fill the instruction queue 282 by replacing already executed block I instructions and would not interfere with the unexecuted block I instructions. If the instruction queue 282 holds more than one instruction block, the send-after cycle count could also be set earlier. For example, if the instruction queue holds two instruction blocks, then the send-after cycle count for block J may be based on execution of the block prior to block I.

The exact definition of the send-after cycle count may also vary depending on the situation. It could be based on the start of instruction transfer by the instruction manager. That is, the instruction manager does not begin transfer of the instruction block until on or after the send-after cycle count. It could also be based on the receipt of instructions by the PE 280. That is, the PE 280 does not start to receive the instruction block until on or after the send-after cycle count.

Figure 2E:
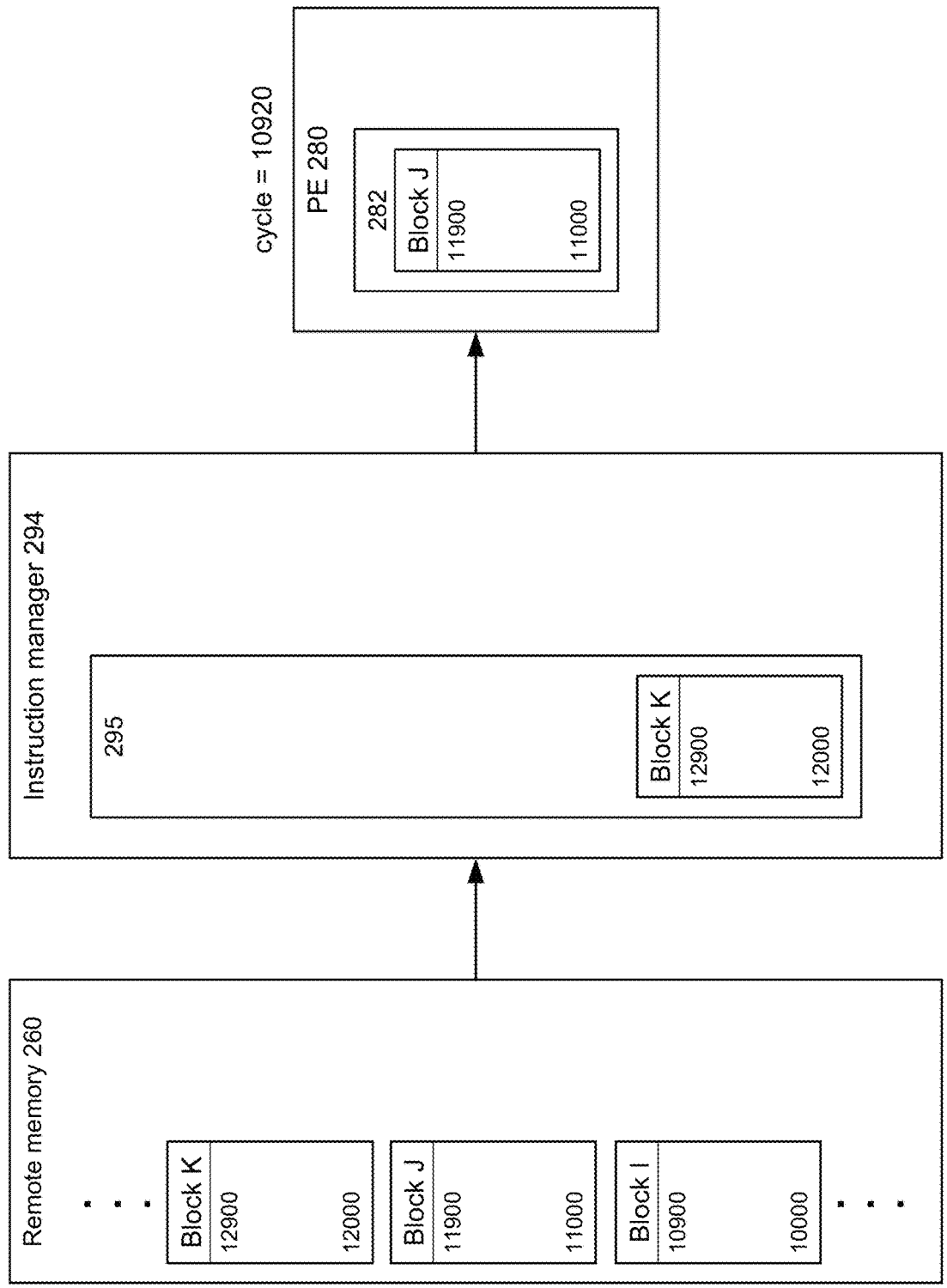

In FIG. 2E, block J is transferred to the instruction queue 282 at execution cycle count=10920, which is after the send-after cycle count of 10900. The transfer of block J could have occurred later. It could occur at any time so long as block J was transferred in sufficient time to be available to the PE 280 by execution cycle count=11000, which is the statically scheduled start time for block J. Thus, the send-before cycle count for block J may be set at 11000, in order to avoid stalling PE 280 due to a lack of instructions.

As with the send-after cycle count, the send-before cycle count does not have to be set exactly at 11000. It could be set earlier to provide additional buffer cycles. It may also be set earlier to account for latency in the transfer. If it takes 10 cycles for block J to arrive at the PE 280, then the send-before cycle count could be set earlier to ensure that the block arrives by execution cycle count=11000. The send-before cycle count may also be adjusted to account for the latency in suspending operation of the instruction execution by the compute elements. The send-before cycle count could also be adjusted if the block J instructions start to fill the instruction queue 282 by replacing already executed block I instructions but before the entire block I has executed.

The exact definition of the send-before cycle count may also vary depending on the situation. It could be based on the start of instruction transfer by the instruction manager. That is, the instruction manager must begin transfer of the instruction block by the send-before cycle count or else a sync request is generated. Alternatively, it could be based on the end of instruction transfer by the instruction manager. The instruction manager must send the last instruction in the block by the send-before cycle count or else a sync request is generated. It could also be based on receipt of the instructions by the PE 280.

Figure 3A:
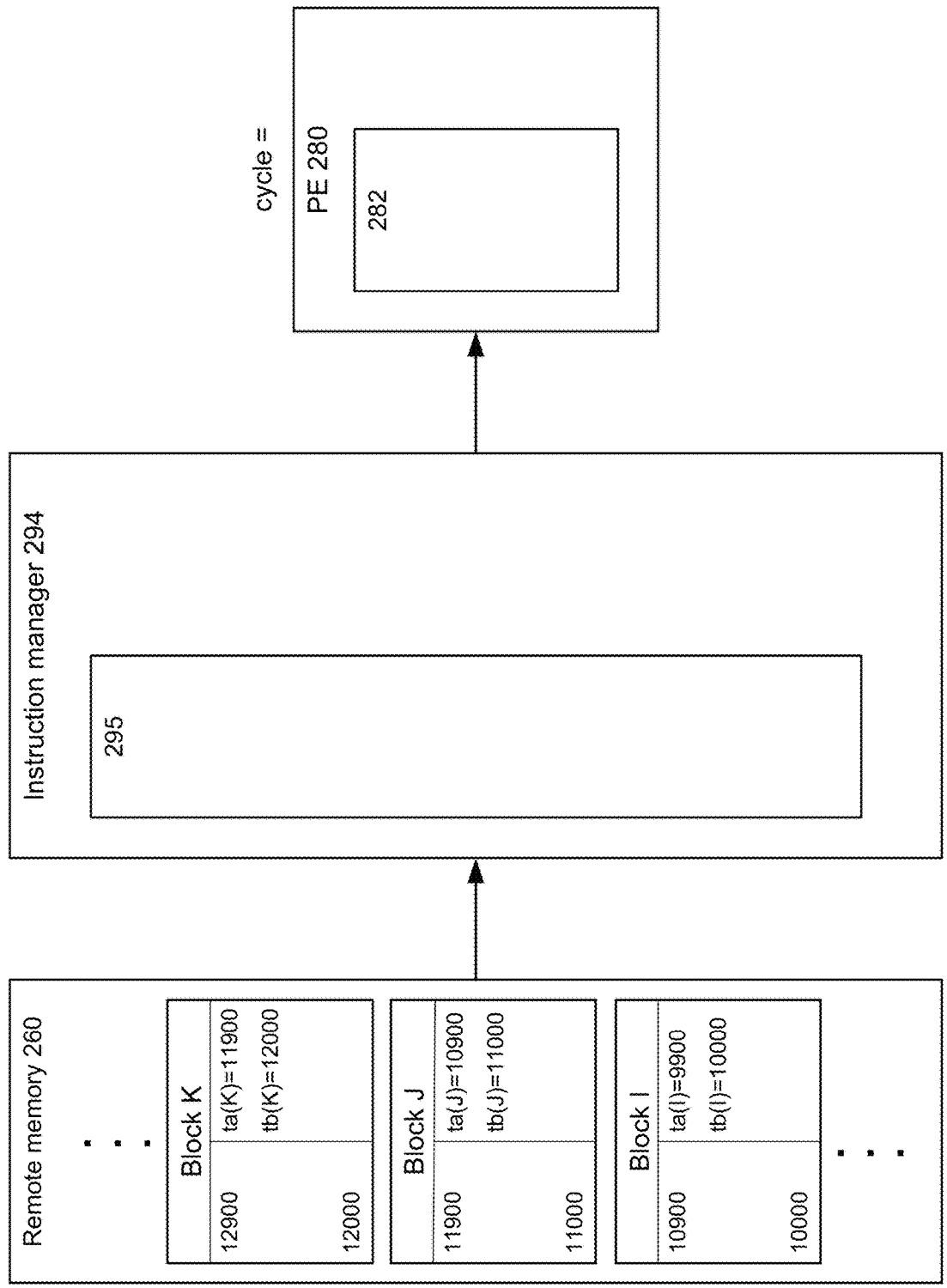
FIGS. 3A-3D are diagrams illustrating daisy chaining of send-before cycle counts.
Figure 3B:
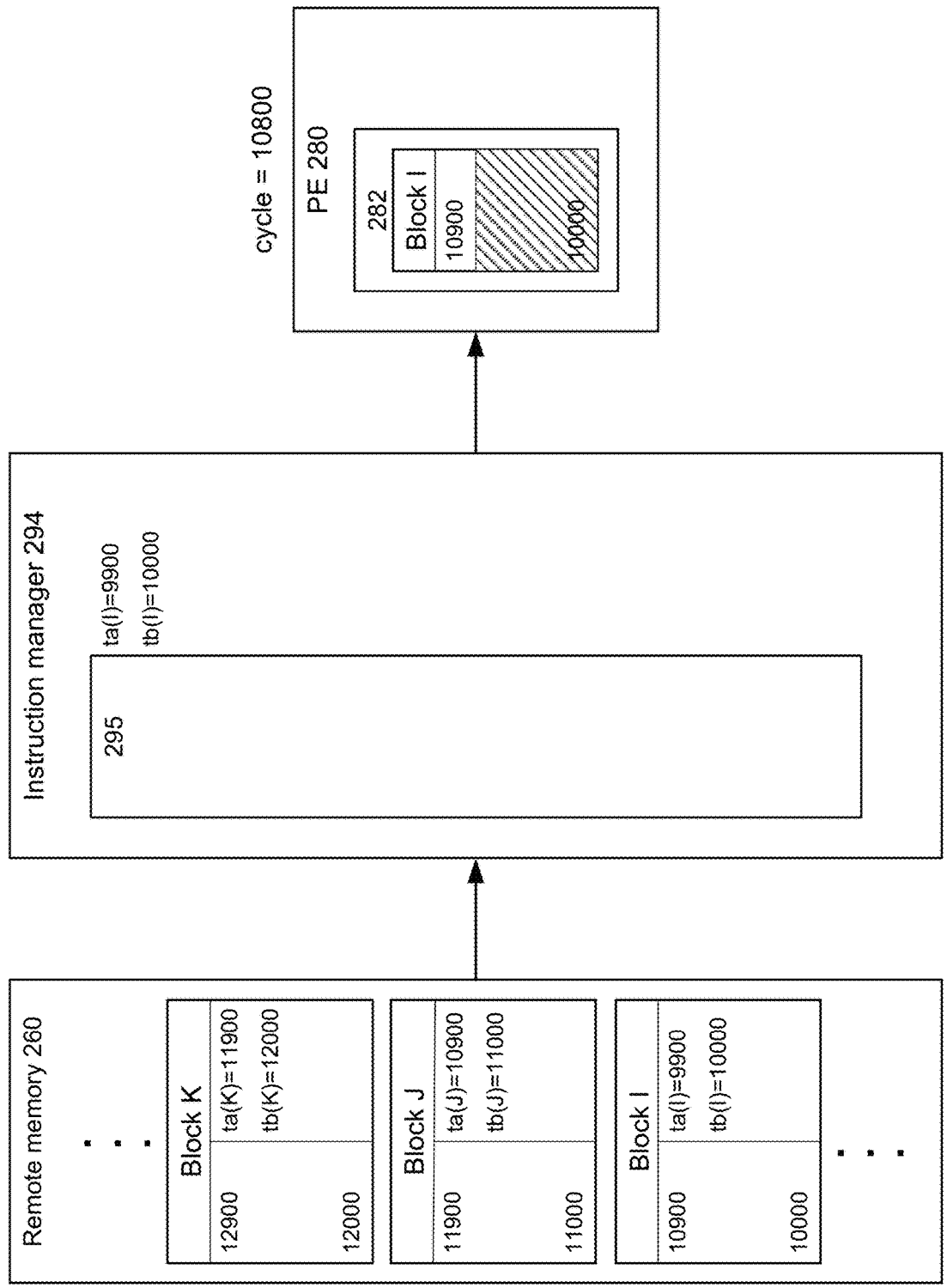

FIGS. 3A-3D illustrate daisy chaining of send-before cycle counts. In FIGS. 3A-3B, assume that the send-after and send-before cycle counts for each block are received with that block. In this example, they are attached as metadata to the instruction blocks. FIG. 3A is the counterpart to FIG. 2A, where the instruction blocks and their corresponding cycle counts are stored in remote memory 260. Instruction block I is scheduled to execute from execution cycle counts 10000-10900. Metadata for block I includes block I's send-after cycle count ta(I)=9900 and its send-before cycle count tb(I)=10000. Block J includes metadata of ta(J)=10900 and tb(J)=11000, and block K includes metadata of ta(K)=11900 and tb(K)=12000.

FIG. 3B is the counterpart to FIG. 2C at execution cycle count=10800, except that the instruction manager 294 has not yet received blocks J or K. Block I is executing in the PE 280, and the instruction manager 294 knows ta(I)=9900 and tb(I)=10000 because that information was received with block I. Perhaps the instruction manager also knows that block I will finish executing at execution cycle count=10900. When the execution cycle count reaches 10900, the instruction manager 294 still has not received block J. To be conservative, the instruction manager 294 may generate a sync request to avoid possibly losing synchronization of the compute elements. However, this is too conservative because tb(J)=11000 so, in reality, the instruction manager 294 could have waited until execution cycle count 11000.

Figure 3C:
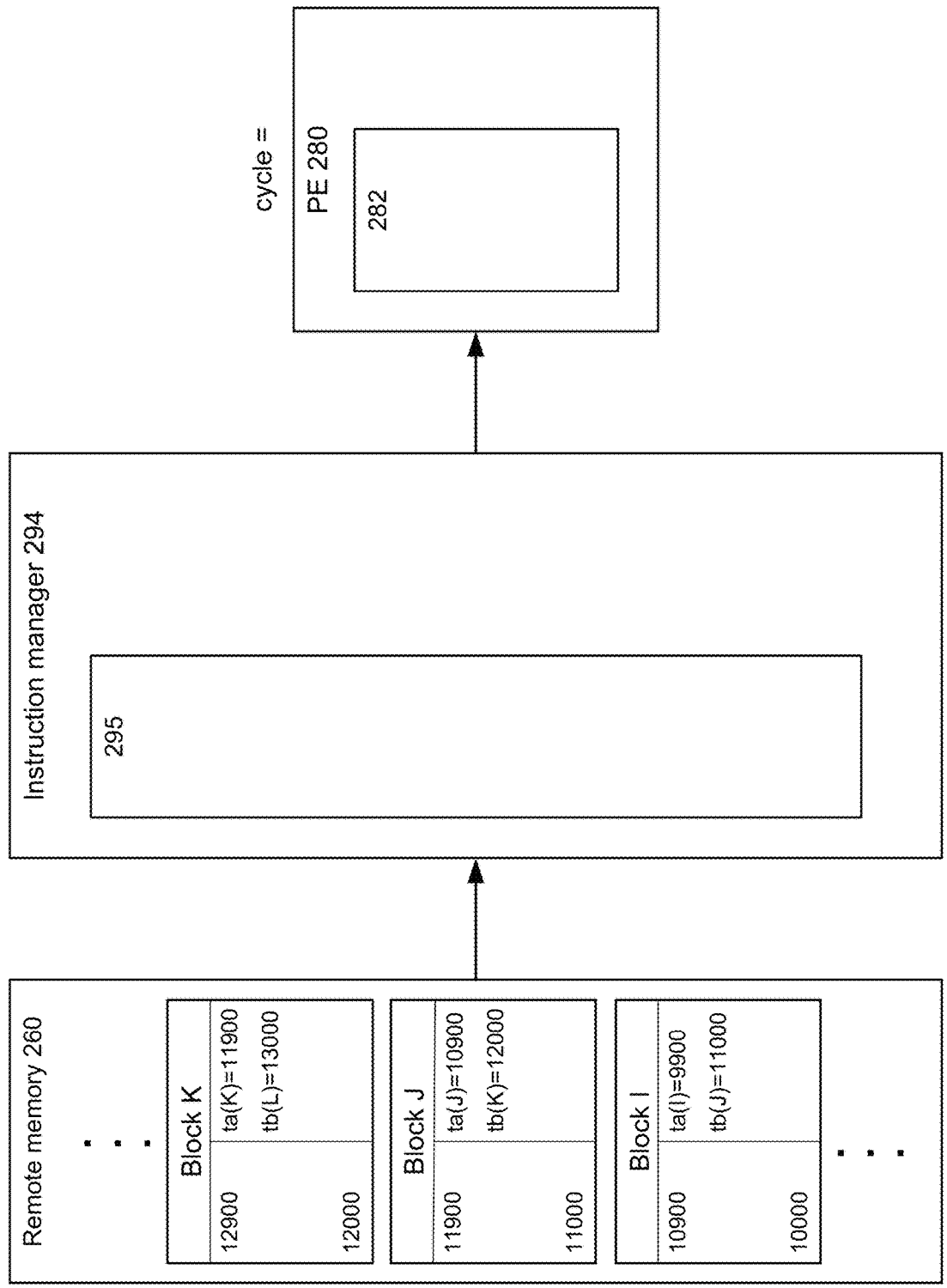
Figure 3D:
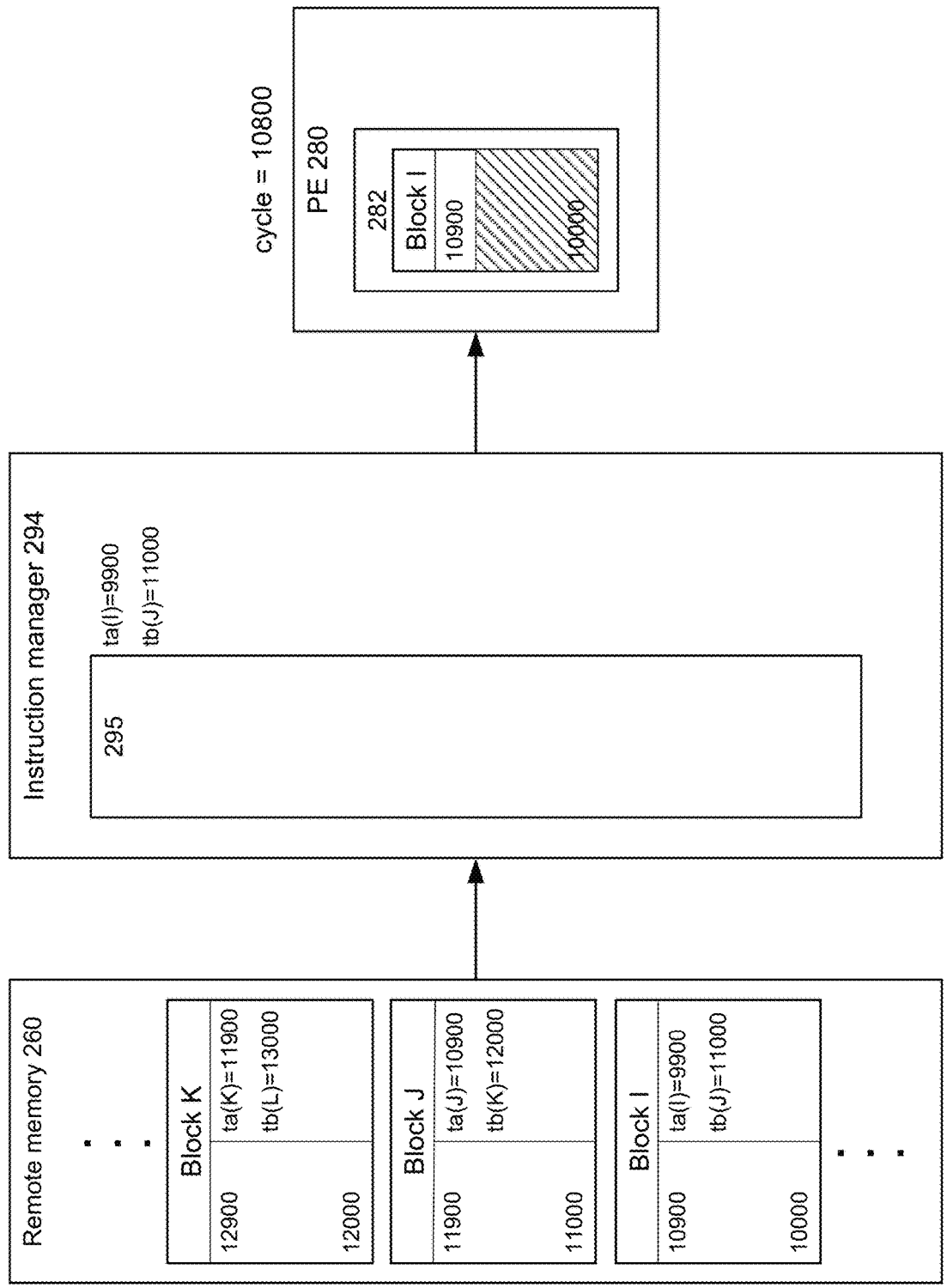

In FIGS. 3C-3D, this problem is addressed by daisy chaining the send-before cycle count. The send-before cycle count for each block is received with the previous block. In FIG. 3C, this is achieved by storing the cycle counts with the blocks. Here, block I is stored with metadata of ta(I)=9900 and tb(J)=11000, which is the send-before cycle count for the next block. Block J is stored with ta(J)=10900 and tb(K)=12000, and so on. In FIG. 3D, at execution cycle count=10800, the instruction manager knows tb(J)=11000 because the send-before cycle count for block J was received with block I. Thus, the instruction manager definitively knows that it can wait until execution cycle count=11000 before generating a sync request. In this approach, no send-before cycle count is received for the first block. However, none is needed because the first block is first so the execution cycles do not start until after the instructions are loaded into the instruction queue and ready for execution. That is, tb(first block) can be set equal to ta(first block)=0, meaning that the execution cycle count starts after the first block of instructions is transferred to the instruction queue.

FIGS. 2-3 illustrate the transfer of instructions to a single PE. However, an MLA typically has many compute elements, including both PEs and SEs. In addition, the MLA may be running multiple programs implementing different machine learning networks, and the programs may contain multiple threads or streams of instructions. The compute elements may also be grouped into larger compute clusters running different threads or streams. Finally, the compute clusters may share paths for instruction transfer.

Figure 4A:
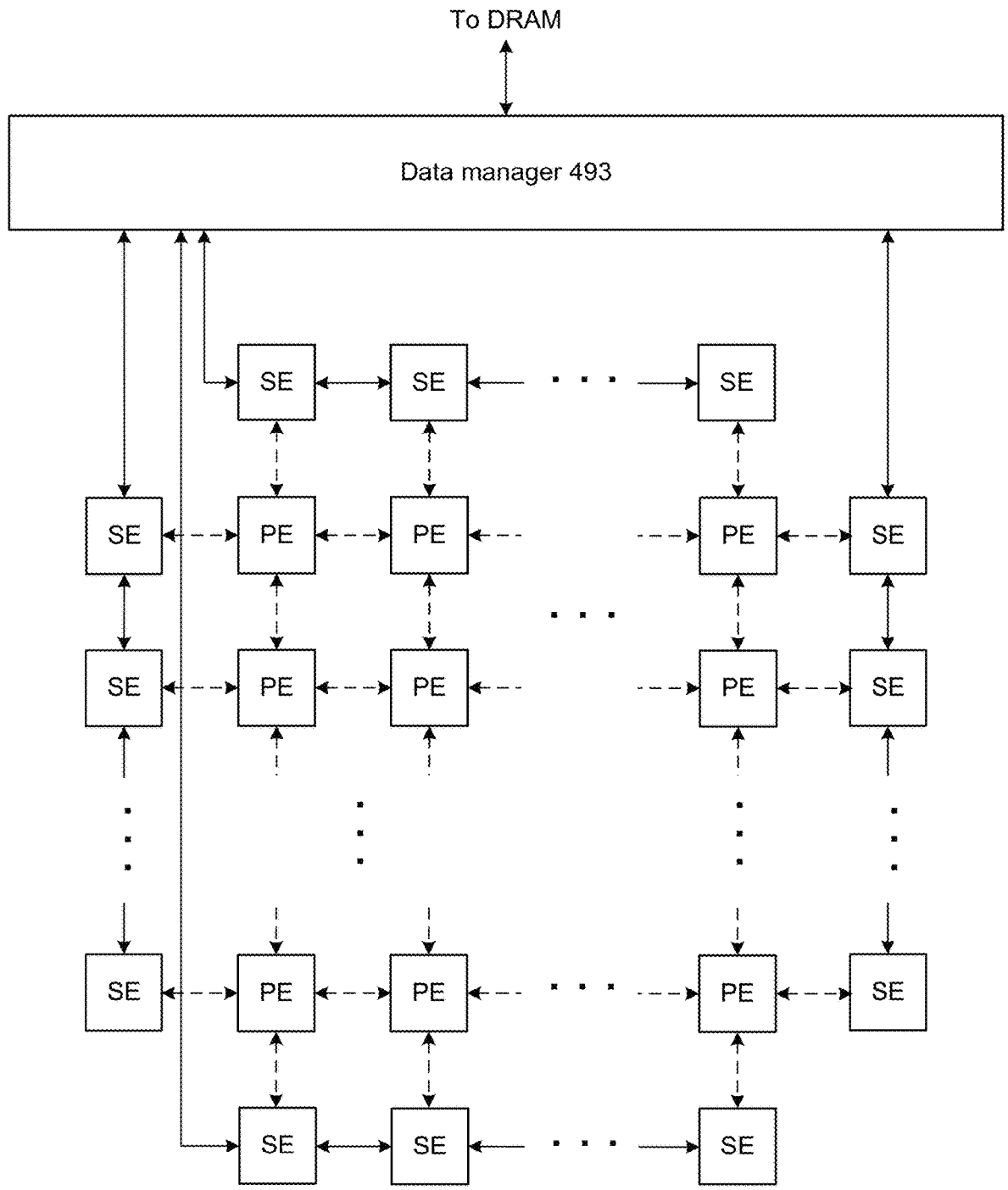
FIG. 4A is a block diagram illustrating data transfer to compute elements in an MLA.
Figure 4B:
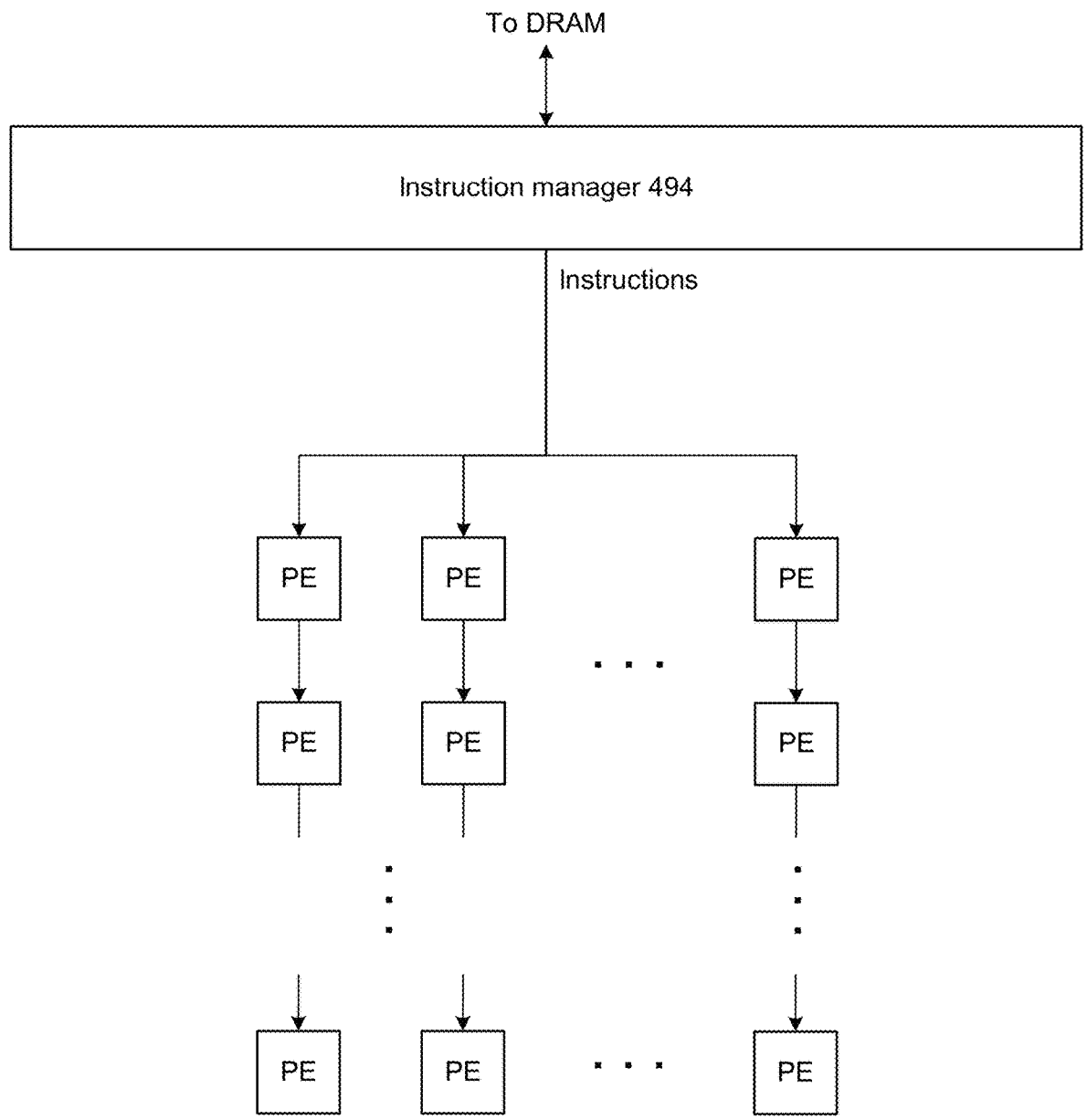
FIGS. 4B and 4C are block diagrams illustrating instruction transfer to compute elements in an MLA.
Figure 4C:
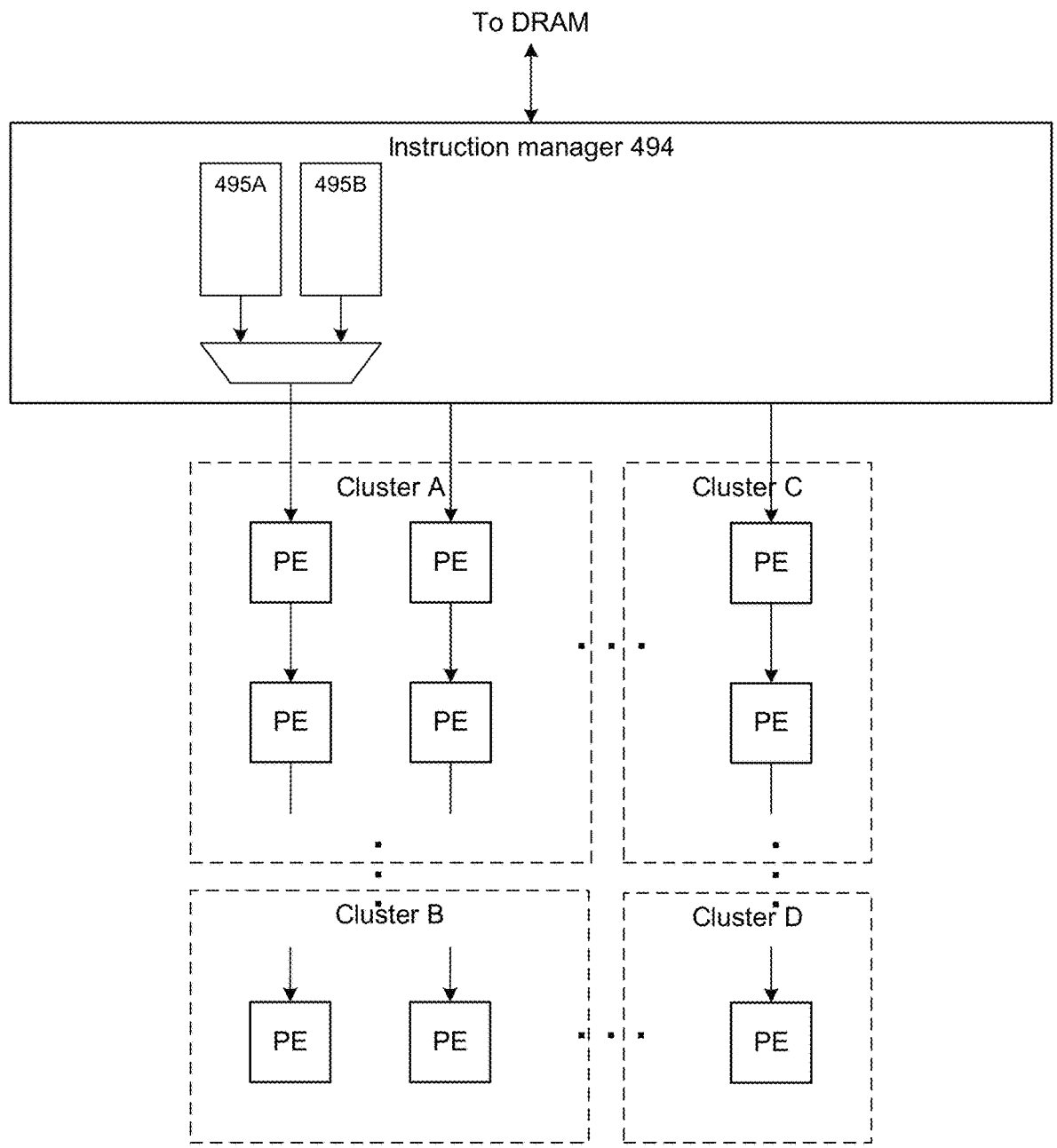

FIGS. 4A-4C are block diagrams illustrating data and instruction transfer to compute elements in an MLA. FIG. 4A is a block diagram of data manager 493, processing elements (PEs) and storage elements (SEs) within an MLA. FIG. 4A shows data paths for the transfer of data. The PEs are arranged as a two-dimensional array, and the SEs are arranged as a ring around the outer edge of the PEs. Data can be transferred as follows. Within the mesh of PEs and SEs, statically scheduled instructions may be used to transfer data between neighboring elements, whether they are PEs or SEs. This is indicated by the dashed arrows. Data transfer to and from off-chip memory (e.g., DRAM) is via the data manager 493. In this particular architecture, only one SE along each edge has direct access to the data manager 493, as indicated by the solid arrows from the data manager. The remaining SEs have daisy-chained access, as indicated by the solid arrows between SEs.

FIG. 4B is a block diagram of instruction manager 494 and processing elements (PEs) within the MLA. Instruction transfer from instruction manager 494 is implemented by daisy chain. The instruction manager 494 provides direct transfer of instructions to one PE at the head of each column, as indicated by the solid arrows. These instructions may be passed to other PEs, as indicated by the arrows between PEs.

FIG. 4C shows a variation in which the instruction manager 494 contains separate queues 495 for each column of PEs. Moreover, the PEs are grouped into clusters A, B, C, D, which operate independently. Each column of PEs has two queues in the instruction manager 494. For example, the first column contains PEs from clusters A and B, so the instruction manager 494 contains queue 495A which is used for instructions to the PEs in cluster A and queue 495B which is used for instructions to the PEs in cluster B. A multiplexer 496 controls which queue 495A/B is connected to the column of PEs.

Instructions destined for the PEs in column 1 of cluster A are transferred from DRAM to queue 495A and instructions destined for the PEs in column 1 of cluster B are transferred from DRAM to queue 495B. Within each queue, the transfer of instruction blocks may be prioritized according to their send-before cycle counts and then according to their send-after cycle counts. Prioritizing by the send-before cycle counts means that those instruction blocks with time windows closing the soonest, will be transferred first. Prioritizing by the send-after cycle counts means that those instruction blocks which have time windows that have been open the longest, will be transferred first. When there are multiple queues for the same column, arbitration may be used to pick a block from one of the queues. The block picked may be the block with the smallest value of (send_before-execution cycle count), where there may be a different execution cycle count for each queue in the arbitration. Multiple queues may be used when each queue belongs to a different cluster in the column.

In this example, the instruction manager 494 has multiple queues 495, which are used to handle different streams of instructions. Other arrangements of queues and transfer paths to the compute elements may be used to accommodate different streams or threads of instructions. The principles shown for the transfer of instructions from DRAM to PEs, may also be used to transfer instructions from DRAM to SEs and to transfer data from DRAM to SEs (e.g., via the data manager of FIG. 4A).

Analogous principles may be used to transfer data from SEs to DRAM. For example, read-after and read-before cycle counts may be used. Roughly speaking, the time window for this data transfer from SE may be defined by the read-after cycle count (data transfer from SE after the read-after cycle count) and closes as defined by the read-before cycle count (data transfer from SE completes before the read-before cycle count). The transfer to DRAM may take place later as long as order is maintained. In some implementations, the data manager (DMA) has descriptors that have these cycle counts daisy chained like described above for instruction blocks.

Figure 5A:
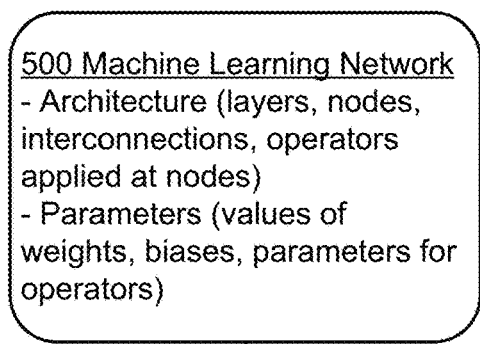
FIG. 5A is a block diagram of a system with a MLA and corresponding compiler.
Figure 5A:
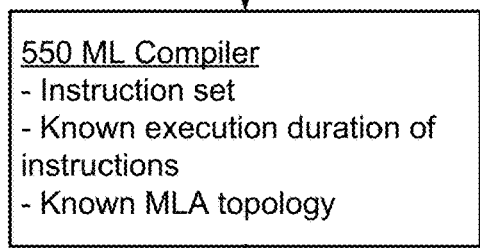
Figure 5A:
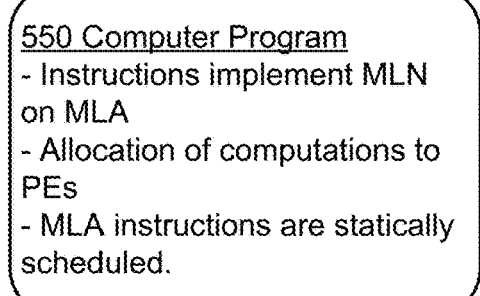
Figure 5A:
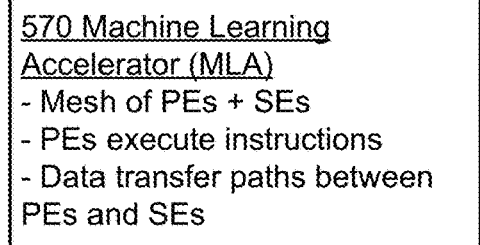
Figure 5A:
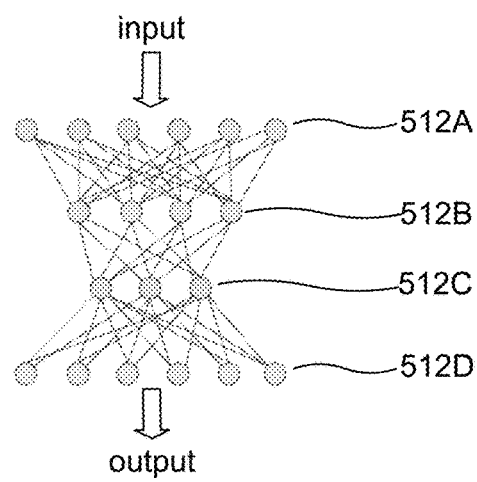
Figure 5A:
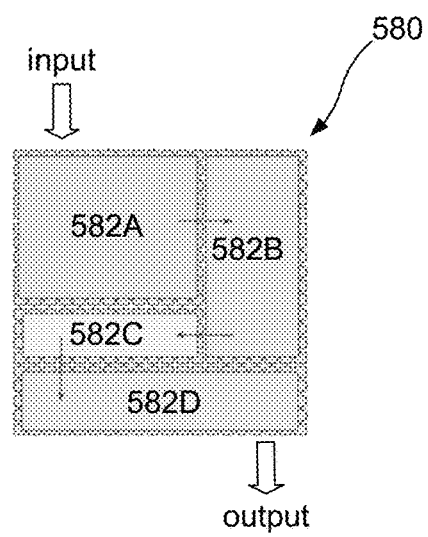
Figure 5B:
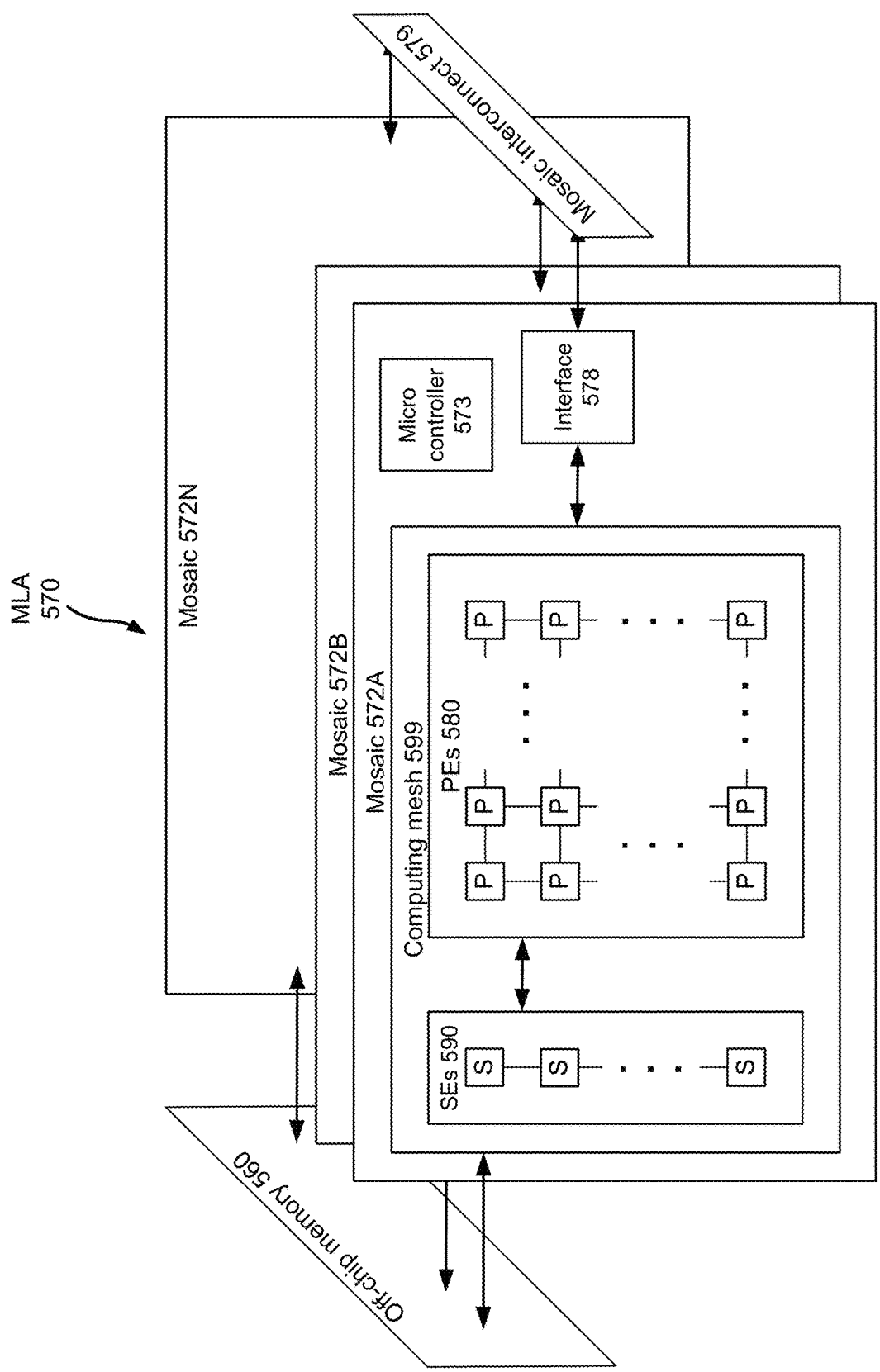
FIG. 5B is a block diagram of a hardware system including an MLA.
Figure 5C:
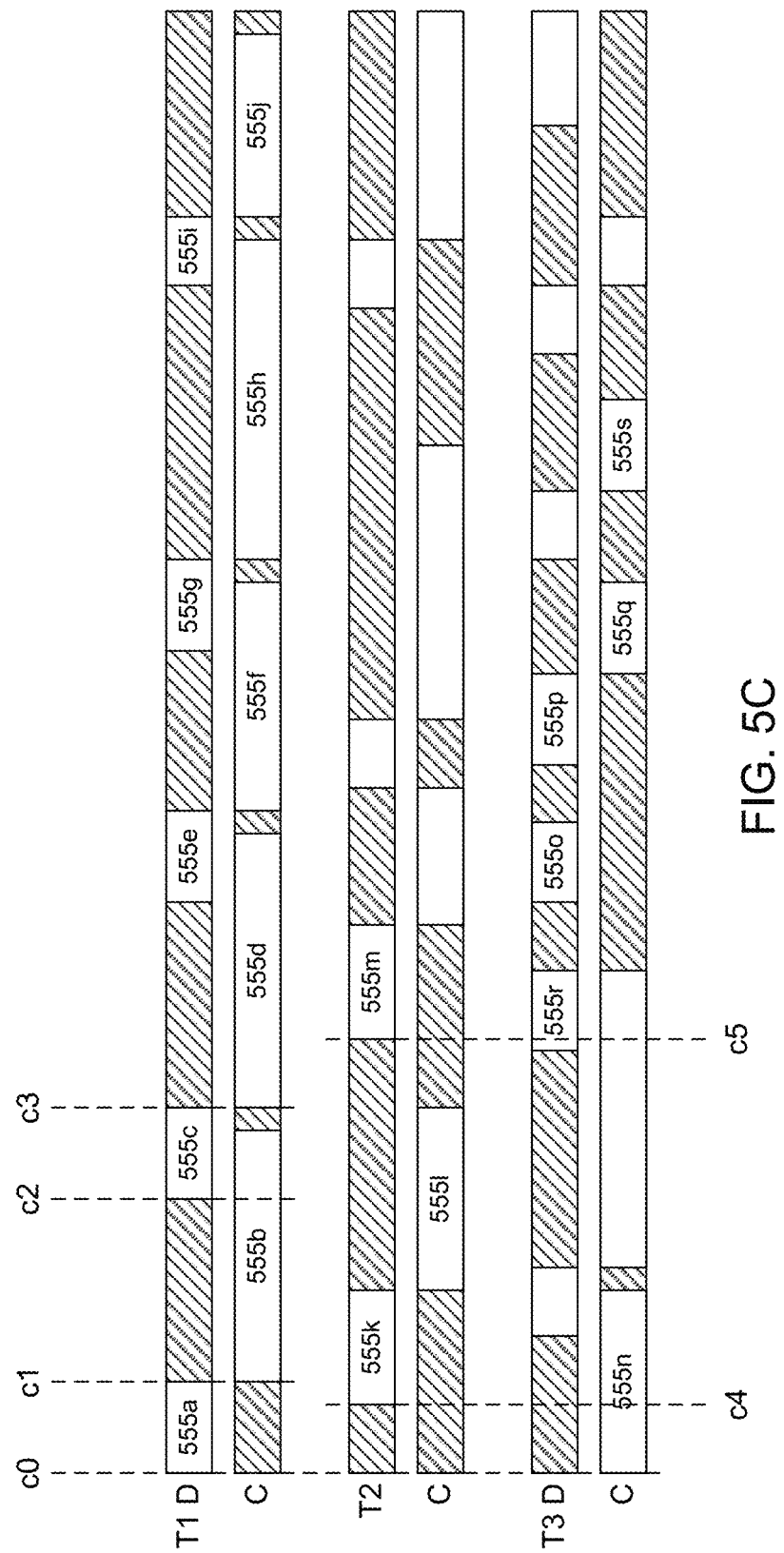
FIG. 5C illustrates execution of a statically scheduled program produced by a compiler.

FIGS. 5A-5C are more detailed descriptions of an example system that executes a statically scheduled program, as may be used with the techniques described above. FIG. 5A is a block diagram of a system with a MLA and corresponding compiler. The MLA may be part of an edge device. The compiler 520 receives a description of a machine learning network 500 and generates a computer program 550 that implements the machine learning network using MLA 570. The computer program 550 includes instructions that are executed by processing elements (Tiles) and/or storage elements (on-chip memory) in the MLA according to a schedule determined by the compiler. Certain instructions may be statically scheduled with respect to each other, because the compiler can determine which instructions are executed by which compute elements at what times, as will be explained in greater detail below. For example, for the statically scheduled instructions, there are no conditions, branching or data dependencies that can be resolved only at run-time, and which would affect the timing and order of the execution of the instructions.

Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the static schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 500 may be described by an architecture and parameters. A depiction of an MLN is shown to the right of box 500 in FIG. 5A. Most MLNs include multiple layers 512, each with one or more nodes which are represented by circles in FIG. 5A. The lines between nodes in FIG. 5A represent interconnections between the nodes and layers. Each node calculates a weighted sum of the values received from its connected nodes, possibly also applying a bias. Examples are matrix multiplication and convolution. Each node may also apply certain functionality or operators, such as nonlinear functions (e.g., tanh function), softmax operator, etc. A typical node may compute an output:

$$y=F(\Sigma w_i x_i + b) \quad (1)$$

where $x_i$ are the inputs received from other nodes i, $w_i$ are weights, b is a bias and F( ) is a nonlinear operator. The MLN architecture includes the number of nodes and layers and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 200 or more layers. Examples of inputs include text, images and video. Some of the layers may be fully interconnected where every node in one layer provides input to every node in the next layer. Others may be more locally interconnected, for example to implement convolutions. Each weighted interconnect represents a scalar multiplication. The total number of scalar multiplications required to implement an MLN may be on the order of millions, billions, tens of billions or even more. These may be carried out by matrix multiplications.

The MLA 570 includes many Tiles 580 and an on-chip memory system with storage elements (not shown in FIG. 5A) implemented on a semiconductor die. The Tiles are organized into one or more meshes of interconnected Tiles. A depiction of a Tile mesh is shown to the right of box 570 in FIG. 5A. In this example, the Tiles 580 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 5A, the computations performed by layers 512A-D are allocated to groups 582A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 520 receives a description of the MLN 500 and generates a computer program 550 that implements the MLN using the MLA 570. The computer program 550 receives an input sample for the MLN and executes the operations of the MLN to produce the output for the MLN. The computer program 550 includes instructions to be executed by the Tiles for implementing computations in the MLN and may also include instructions to be executed by other elements, such as the storage elements of the on-chip memory or a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

The program of statically scheduled instructions may include a series of computations required to implement a portion of the MLN, where the time required for each computation and associated data transfers is known. As a result, the compiler may statically schedule these instructions. The resulting computer program produced by the compiler then implements an allocation of compute instructions to Tiles and a schedule for executing the instructions as determined by the compiler, although these may not be expressly contained with the computer program.

Non-deterministic instructions (i.e., instructions that are not statically scheduled) may also be used. For example, non-deterministic instructions may include data fetch and instruction fetch from off-chip memory where the time required to execute the operation varies too much to allow reliable synchronization with other operations. Other examples include computations that occur off-chip, and conditions, branching and other programmatic constructs that depend on values not known until run-time.

FIG. 5B is a block diagram of a hardware system including an MLA 570. The MLA 570 includes all the components shown in FIG. 5B, except the off-chip memory 560. The MLA components are implemented on a single die as part of a single chip. The MLA 570 includes one or more mosaics 572A-N. In this example, all of the mosaics are the same. Each mosaic 572 includes a computing mesh 599 that includes processing elements (PEs or Tiles) 580 and storage elements (SEs) 590. Each mosaic 572 also includes a controller 573, which may include the sync controller 196 of FIG. 1. In FIG. 5A, the overall memory system is a multi-level memory system, which includes a level 1 (L1) memory distributed within the Tiles, a level 5 (L2) memory of SEs 590 which is shared by the Tiles, and the off-chip memory 560. If there are multiple mosaics 572, the MLA 570 may include a dedicated interconnect 579 for connecting the different mosaics. Each mosaic also includes an interface 578 to the interconnect 579. In FIG. 5B, The SEs 590 handle data transfer to and from the off-chip memory 560. The PEs 580 receive instructions from the off-chip memory 560. For convenience, the interface to off-chip memory 560 is not shown in FIG. 5B.

FIG. 5C illustrates execution of a statically scheduled program produced by a compiler. This example shows only instructions executed by PEs (Tiles) but the statically scheduled program typically also includes instructions executed by SEs. Execution of the static schedule begins at some time when all of the Tiles are synchronized, which for convenience is marked as cycle c0 in FIG. 5C. An external controller, such as the sync controller 196, may synchronize the Tiles and start execution of the statically scheduled program when all Tiles are ready.

The example instructions shown in FIG. 5C are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 555a transfers data into Tile 1 from either another Tile or from ones of the SEs, and instruction 555b then performs a computation that consumes that data. Instruction 555b is dependent on instruction 555a. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 555a is known, the compiler knows when the data will be available (for convenience, marked as cycle c1 in the figure) and can construct a static schedule in which instruction 555b starts execution then. The duration of instruction 555b is also known, so the compiler knows that compute instruction 555d may start after instruction 555b. In this case, the compiler determines a static schedule in which instruction 555d starts at cycle c3. Compute instruction 555d depends on data brought into the Tile by instruction 555c. The duration of instruction 555c is known, so the compiler knows that in the static schedule, instruction 555c must start at cycle c2 or earlier. This pattern is repeated for pairs of data transfer instructions and compute instructions 555e-f, 555g-h, 555i-j.

For Tile 2, compute instruction 555l depends on data from data transfer instruction 555k. However, instruction 555k does not start immediately at cycle c0. Rather, it has a delayed start at cycle c4. This may be because the data transfer path required by instruction 555k is occupied by some other data transfer instruction and is not available until cycle c4. The start time of instruction 555k in the static schedule is not determined by run-time arbitration or contention mechanisms for the shared data transfer path. Rather, the compiler knows that the data transfer path is occupied since the compiler knows the start times and durations of all the data transfer instructions, so the compiler simply creates a static schedule in which instruction 555k does not start until cycle c4 when the compiler knows the data transfer path will be available. Similarly, data transfer instruction 555m has a delayed start time. Perhaps the T2 D pipeline is being used to transfer out the results of computation 555l and does not become available until cycle c5.

For Tile 3, computation 555n starts immediately at cycle c0. Perhaps the required data was loaded into Tile 3 during some prior phase. Data transfer instructions 555o and 555p load data for compute instruction 555q. They are separated in time, perhaps because different pieces of data were not available or the data transfer paths were not available until those times. As a final example, data transfer instruction 555r loads data for compute instruction 555s. In the static schedule, the compiler places instruction 555r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 5C, the computer program may specify that instruction 555a executes at cycle c0, instruction 555b at cycle c1, instruction 555c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 555a will end at cycle c1 and instruction 555b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 555b is executed according to the compiler's static schedule. In yet another approach, the static schedule may be implemented by hardware. The T1 C pipeline may just stall on the execution of instruction 555b until the data from instruction 555a is ready. The compiler knows that data will be ready at cycle c1 and, therefore, instruction 555b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

The static schedule of FIG. 5C occurs within the computing mesh 599. The compiler assumes that instructions executed according to the static schedule have been fetched from the off-chip memory 560 in time for their execution, for example, that compute instruction 555b has been fetched from off-chip memory by cycle c1, and compute instruction 555*d* has been fetched by cycle c3. Similarly, the compiler also assumes that data used by instructions of the static schedule have also been retrieved from the off-chip memory 560 in time for their consumption. For example, if the data for data transfer instruction 555*a* is coming from off-chip memory, then it has been transferred to the relevant SE or PE by cycle c0, so it can then be transferred by instruction 555*a* to Tile 1. Similarly, the data for data transfer instruction 555*c* has been transferred to the relevant SE or PE by cycle c2.

Figure 6:
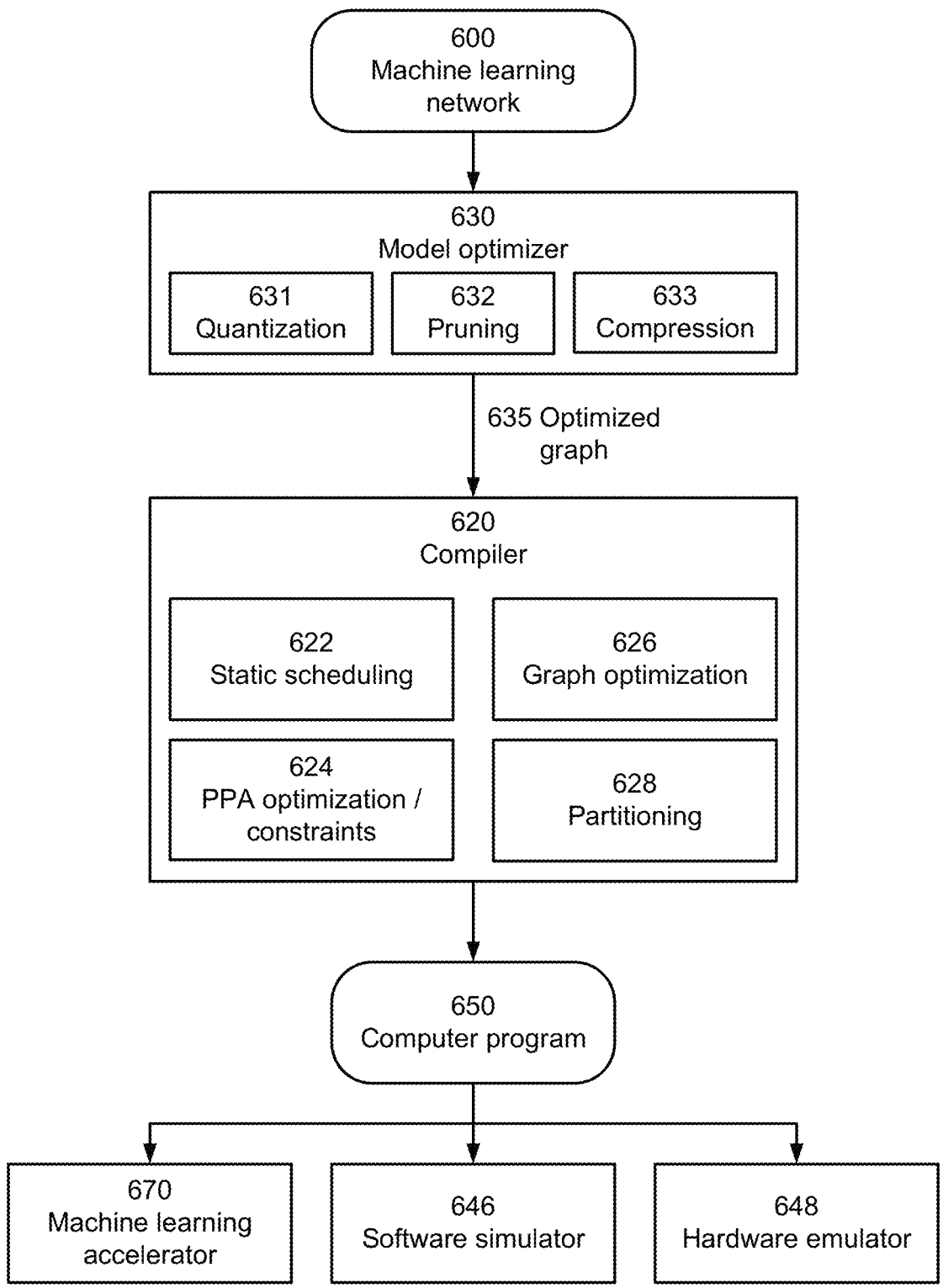
FIG. 6 is a block diagram of a software development environment including a machine learning (ML) compiler.

FIG. 6 is a block diagram of a software development environment including a machine learning (ML) compiler 620. In this example, the software development environment also includes a model optimizer 630. The model optimizer 630 receives a description of the MLN 600 and produces an optimized graph 635 of the MLN. It may apply optimizations such as quantization 631, pruning 632 and/or compression 633. Quantization 631 reduces the resolution of calculated values. For example, floating point values may be quantized to a certain number of bits and then integer math used instead of floating point math. This reduces the complexity and power consumed by the Tiles. Pruning 632 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 635 of the MLN may be expressed as a graph, in which the nodes of the graph represent nodes in the MLN and the edges of the graph represent the weighted interconnects. The compiler 620 receives the optimized graph 635 and produces the resulting computer program 650. The compiler 620 may perform operations including static scheduling 622, PPA (power performance area) optimizations 624, graph optimizations 626 and/or partitioning 628.

In order to statically schedule 622 the deterministic instructions, the compiler typically will know the duration of each instruction (i.e., how long each instruction takes to execute), the capabilities of each element (which processing elements and storage elements can execute which instructions), the topology of data transfer paths to and from Tiles (including between Tiles, and between Tiles and on-chip memory), and the computations required and their dependencies (i.e., the MLN description). With this information, the compiler can schedule unconditional start times for the deterministic instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

PPA optimization 624 includes different optimizations of the computer program 650. For example, the allocation of MLN computations to Tiles may be optimized to reduce power consumption, to increase performance (such as reducing latency or increasing throughput) and/or to reduce area (e.g., number of Tiles used). The compiler 620 may also optimize 624 the computer program 650, subject to constraints on power, performance, area and/or any of the quantities described above. Graph optimization 626 includes analysis of the graph representing the MLN to prune, merge or quantize links, parameters, values, and layers to achieve better performance. Partitioning 628 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 650 may be loaded into memory for execution on a machine learning accelerator 670. For example, one possible application is object detection. In this case, the inputs are images captured by a video camera. The MLN 600 has been trained to identify certain objects in the video images. The computer program 650 implementing the MLN is loaded onto memory that is accessible by the MLA 670, which is implemented as a chip inside the camera. This way, images captured by the video camera may be immediately analyzed by the computer program 650 running on the MLA 670.

In addition to the MLA 670, the computer program 650 or parts of it may be run on a software simulator 646 and/or hardware emulator 648 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 7:
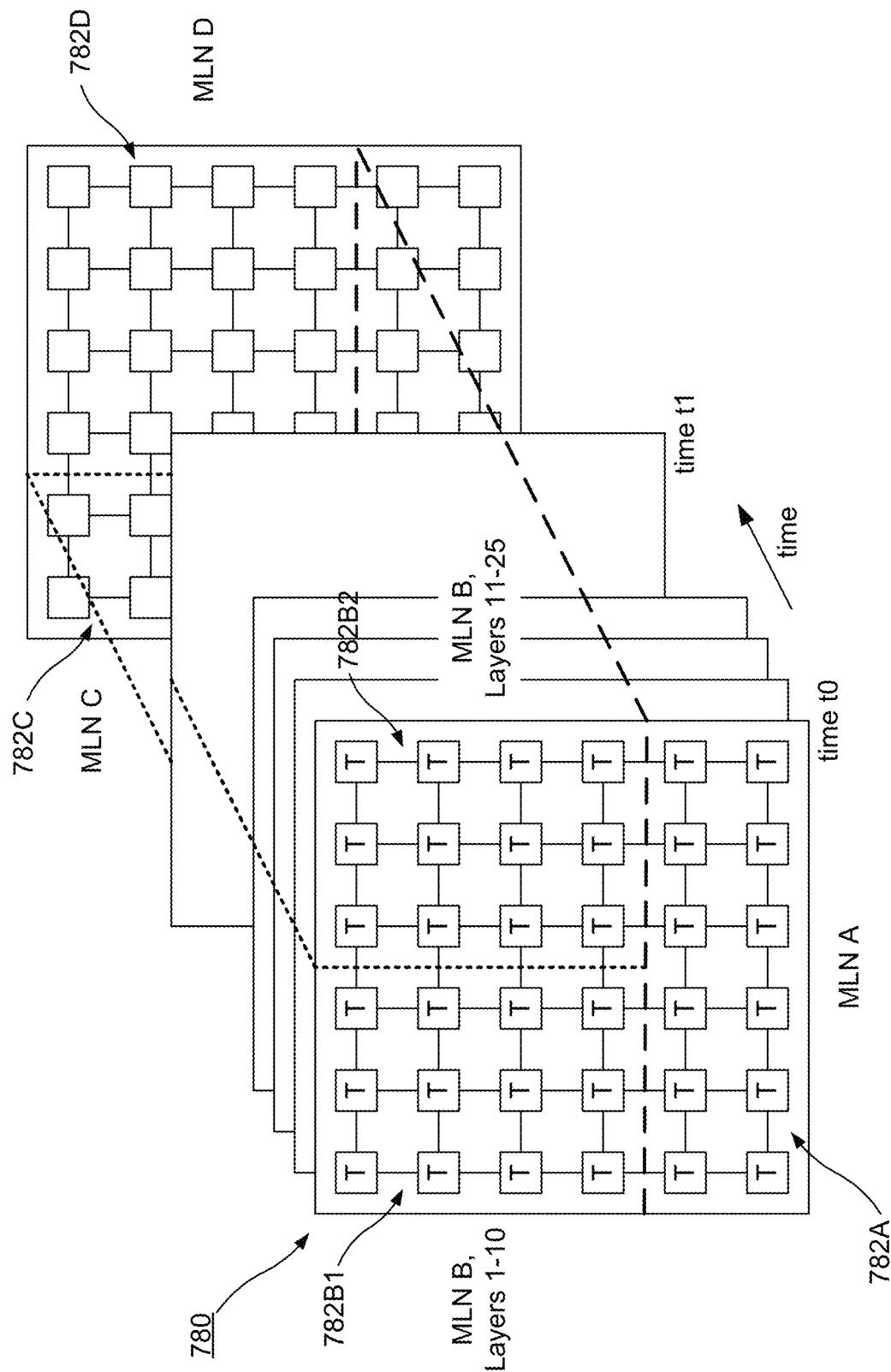
FIG. 7 is a block diagram of an MLA with a 6×6 mesh of Tiles.

The embodiments described above may be used to execute a single MLN. However, the MLA is enabled to execute multiple MLNs. FIG. 7 illustrates partitioning the mesh of Tiles to different subnets of an MLN and to different MLNs. In FIG. 7, the MLA includes a 6×6 mesh (element 780 in FIG. 7). From time t0 to t1, the mesh 780 is utilized to implement two different MLNs: MLN A and MLN B. The Tiles are divided into three partitions 782A, 782B1, and 782B2. Partition 782A implements MLN A, partition 782B1 implements the first 10 layers of MLN B, and partition 782B2 implements the remaining 15 layers of MLN B. MLN B may be partitioned in this manner because some off-Tile operations may be required between layers 10 and 11. Maybe the output of layer 10 requires a computation that is performed off-Tile in a non-deterministic manner, or maybe layers 11-25 require data that cannot be loaded in a manner consistent with the static scheduling of layers 1-10. After time t1, the mesh 780 continues to implement MLN B using partition 782A, but MLN A is replaced by MLNs C and D using partitions 782C and 782D, respectively.

FIG. 7 shows a progression over time. The front diagram shows the partitioning at an earlier time and the subsequent diagrams show the partitioning at later times. The times are indicated to the lower right of the diagrams. At time to, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. 11-25. The upper left 4×2 Tiles now implement MLN C, and the upper right 4×4 Tiles now implement MLN D. The different MLNs may execute and maintain synchronization independent of each other.

Figure 8:
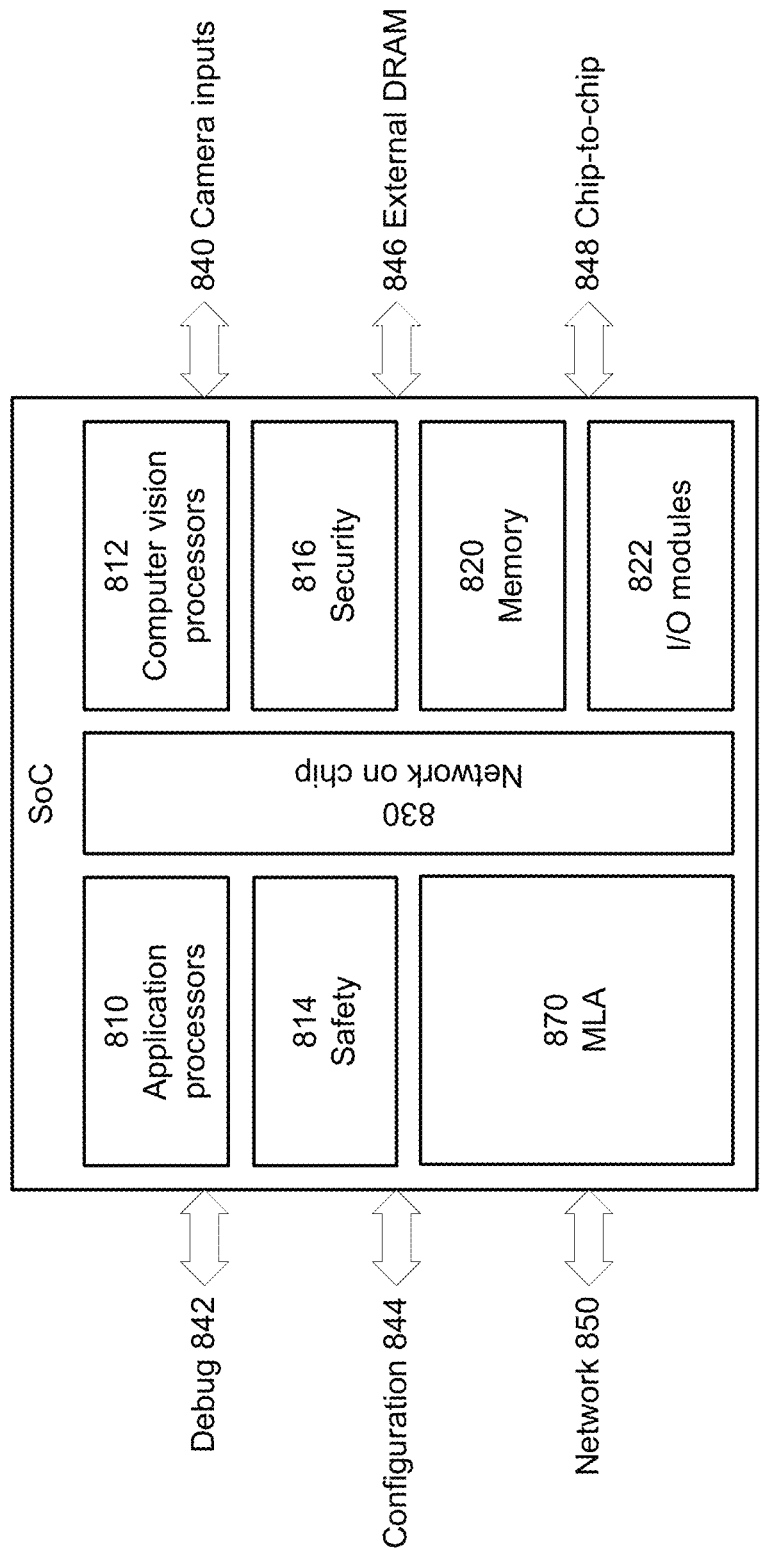
FIG. 8 is a block diagram of an integrated circuit that includes an MLA.

As discussed above, the MLA includes various components that are on the same die. The MLA may be integrated into a larger integrated circuit product (e.g., as part of an edge device). FIG. 8 is a block diagram of an integrated circuit that includes an MLA 870. Other components may be included on the same die as the MLA. This example includes the following additional blocks: application processor 810 (e.g., general purpose CPU running applications), computer vision processor 812 (or other types of application-specific processors), safety 814, security 816, additional SRAM (memory) 820 and input/output circuitry 822. It also includes a network 830 for communication between the different components. This type of semiconductor chip may be referred to as a system-on-chip (SoC).

The connections to the external world include camera inputs 840 for the computer vision processors, ports for debug 842 and configuration 844, a connection 846 to external memory (e.g., DRAM), chip-to-chip connections 848, and network connections 850 (e.g., Ethernet and PCIe).

The SoC of FIG. 8 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 812, which perform initial operations such as edge detection and enhancement, contrast enhancement, motion detection, and optical flow. Raw and/or processed images may be then input to the MLA 870 for analysis by the machine learning network. The MLA may also receive other inputs, such as metadata from other sources and data from other sensors. The application processors 810 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A machine learning accelerator (MLA) implemented on a semiconductor die, the MLA comprising:
   a computing mesh of interconnected compute elements configured to execute instructions according to a static schedule clocked by an execution cycle count, the instructions implementing a machine learning network;
   a memory interface to off-chip memory, wherein the instructions are stored in the off-chip memory;
   an instruction manager that receives the instructions from the off-chip memory and transfers blocks of the instructions to the compute elements for execution; wherein the instruction manager has access to the execution cycle count, send-before cycle counts for the instruction blocks identify execution cycle counts for a specific action relating to timing of completion of the transfers, and the instruction manager generates a sync request if the specific action has not occurred by the send-before cycle count; and
   a sync controller configured to suspend operation of the computing mesh in response to the sync request.

2. The machine learning accelerator of claim 1 wherein occurrence of the specific action by the send-before cycle count avoids stalling of the compute elements due to a lack of instructions.

3. The machine learning accelerator of claim 1 wherein the instruction manager generates the sync request if transfer of the instruction block does not begin by the send-before cycle count.

4. The machine learning accelerator of claim 1 wherein the instruction manager generates the sync request if transfer of the instruction block does not finish by the send-before cycle count.

5. The machine learning accelerator of claim 1 wherein receiving the instructions from the off-chip memory comprises fetching the instructions blocks from the off-chip memory and, for each instruction block, also fetching the send-before cycle count for a next instruction block.

6. The machine learning accelerator of claim 1 wherein send-after cycle counts for the instruction blocks identify execution cycle counts for a particular action relating to timing of beginning of the transfers, and the instruction manager ensures the particular action occurs in accordance with the send-after cycle count.

7. The machine learning accelerator of claim 6 wherein occurrence of the particular action in accordance with the send-after cycle count avoids conflict with execution of a previous instruction block.

8. The machine learning accelerator of claim 6 wherein occurrence of the particular action in accordance with the send-after cycle count ensures that the compute elements have sufficient storage space to receive the instruction block.

9. The machine learning accelerator of claim 6 wherein the instruction manager does not begin transfer of the instruction block until on or after the send-after cycle count.

10. The machine learning accelerator of claim 1 wherein the send-before cycle counts account for latency in transferring the instruction blocks from the instruction manager to the compute elements.

11. The machine learning accelerator of claim 1 wherein the send-before cycle counts account for latency in suspending operation of the computing mesh.

12. The machine learning accelerator of claim 1 wherein the instruction manager prioritizes transfer of instruction blocks according to their send-before cycle counts.

13. The machine learning accelerator of claim 12 wherein send-after cycle counts for the instruction blocks identify execution cycle counts for a particular action relating to timing of beginning of the transfers, and the instruction manager prioritizes transfer of instruction blocks first according to their send-before cycle counts and then according to their send-after cycle counts.

14. The machine learning accelerator of claim 12 wherein the instruction manager includes multiple queues for transfer of instructions to the compute elements, assigns instruction blocks to queues, and prioritizes transfer of instruction blocks within each queue according to their send-before cycle counts.

15. The machine learning accelerator of claim 1 wherein the instructions comprise multiple streams of instructions.

16. The machine learning accelerator of claim 15 wherein the instruction manager includes multiple queues for transfer of instructions to the compute elements, and at least one queue receives instruction blocks from at least two different streams of instructions.

17. The machine learning accelerator of claim 1 wherein the interconnected compute elements comprise interconnected storage elements (SEs) and processing elements (PEs); the instructions include data transfer instructions for data transfer between the SEs and/or PEs and compute instructions for computations by the PEs; and the PEs have instruction queues that store the transferred instructions for execution by the PEs.

18. The machine learning accelerator of claim 17 wherein the PEs comprise a two-dimensional array of PEs with PEs connected to their adjacent neighbors, and the SEs comprise a ring of SEs around the array of PEs with SEs connected to PEs on a periphery of the array.

19. The machine learning accelerator of claim 18 wherein the SEs are SRAM, the off-chip memory is DRAM, and the SEs and PEs have DMA access to the DRAM.

20. A machine learning accelerator (MLA) implemented on a semiconductor die, the MLA comprising:
- a computing mesh of interconnected compute elements configured to execute instructions according to a static schedule clocked by an execution cycle count, the instructions implementing a machine learning network;
- a memory interface to off-chip memory, wherein data consumed by the instructions are stored in the off-chip memory;
- a data manager that receives the data from the off-chip memory and transfers blocks of the data to the compute elements for use in instruction execution; wherein the instruction manager has access to the execution cycle count, send-before cycle counts for the data identify execution cycle counts for a specific action relating to timing of completion of the transfers, and the instruction manager generates a sync request if the specific action has not occurred by the send-before cycle count; and
- a sync controller configured to suspend operation of the computing mesh in response to the sync request.

* * * * *